United States Patent

White

(10) Patent No.: US 11,989,488 B2
(45) Date of Patent: May 21, 2024

(54) AUTOMATICALLY AND INTELLIGENTLY EXPLORING DESIGN SPACES

(71) Applicant: Google LLC, Mountain View, CA (US)

(72) Inventor: David Allan White, San Jose, CA (US)

(73) Assignee: Google LLC, Mountain View, CA (US)

( * ) Notice: Subject to any disclaimer, the term of this patent is extended or adjusted under 35 U.S.C. 154(b) by 965 days.

(21) Appl. No.: 16/943,126

(22) Filed: Jul. 30, 2020

(65) Prior Publication Data

US 2021/0326494 A1 Oct. 21, 2021

Related U.S. Application Data

(60) Provisional application No. 63/010,438, filed on Apr. 15, 2020.

(51) Int. Cl.
G06F 30/12 (2020.01)
G06F 30/27 (2020.01)
G06N 20/00 (2019.01)

(52) U.S. Cl.
CPC ............ G06F 30/12 (2020.01); G06F 30/27 (2020.01); G06N 20/00 (2019.01)

(58) Field of Classification Search
CPC .......... G06F 30/12; G06F 30/27; G06N 20/00
(Continued)

(56) References Cited

U.S. PATENT DOCUMENTS 8,255,293 B1 * 8/2012 Davies ............... G06Q 30/0251
705/14.72
RE46,178 E * 10/2016 Afeyan ................ G06Q 10/101
(Continued)

FOREIGN PATENT DOCUMENTS

JP 2003-141180 5/2003
JP 5639544 12/2014
(Continued)

OTHER PUBLICATIONS

Chaudhuri et al. (Attriblt: Content Creation with Semantic Attributes, UIST'13, 2013, pp. 193-202) (Year: 2013).*
(Continued)

Primary Examiner — Iftekhar A Khan
(74) Attorney, Agent, or Firm — Fish & Richardson P.C.

(57) ABSTRACT

Methods, systems, and computer readable medium include receiving, from a user device, a request for a digital component, receiving a data set of user-provided information regarding a particular product design, generating, based on the data set, a visual representation mapping design factors to potential product design geometry, segmenting the visual representation based on the design factor values, selecting a segment that contains less than a threshold amount of data points, selecting a digital component, dynamically altering, based on the selected segment, a presentation of the digital component that solicits information from the user about the segment, distributing, for presentation at the user device, the dynamically-altered digital component, obtaining, from the user device through a feedback mechanism, feedback information regarding the segment that contains less than the threshold amount of data points, and modifying a design factor of the particular product design based, at least in part, on the feedback information.

20 Claims, 18 Drawing Sheets

(58) Field of Classification Search
USPC .......................................................... 703/2
See application file for complete search history.

(56) References Cited

U.S. PATENT DOCUMENTS

| | | | | |
|---|---|---|---|---|
| 9,799,041 | B2* | 10/2017 | Karty | G06N 3/126 |
| 10,957,086 | B1* | 3/2021 | Mathon | G06Q 30/0201 |
| 2010/0169313 | A1* | 7/2010 | Kenedy | G06F 16/9535 |
| | | | | 707/E17.108 |
| 2011/0125591 | A1* | 5/2011 | Evans | G06Q 30/0276 |
| | | | | 705/14.72 |
| 2012/0303559 | A1* | 11/2012 | Dolan | G06N 20/00 |
| | | | | 706/12 |
| 2013/0226925 | A1* | 8/2013 | Carbonell | G06F 16/345 |
| | | | | 707/E17.069 |
| 2015/0012467 | A1* | 1/2015 | Greystoke | G06Q 30/0619 |
| | | | | 706/12 |
| 2015/0213164 | A1* | 7/2015 | Wang | G06F 30/23 |
| | | | | 703/2 |
| 2015/0228002 | A1* | 8/2015 | Berger | G06Q 30/0627 |
| | | | | 705/26.63 |
| 2015/0339754 | A1* | 11/2015 | Bloem | G06F 16/9535 |
| | | | | 705/26.7 |
| 2016/0267684 | A1* | 9/2016 | Li | G09G 5/06 |
| 2018/0157499 | A1* | 6/2018 | Lee | G06F 9/451 |
| 2018/0165375 | A1* | 6/2018 | Silkey | G06F 16/986 |
| 2018/0196895 | A1* | 7/2018 | Soppitt | G06F 30/00 |
| 2020/0063308 | A1* | 2/2020 | Schultz | G06T 19/20 |
| 2020/0364390 | A1* | 11/2020 | Larsen | G06F 17/18 |
| 2021/0326312 | A1* | 10/2021 | White | G06F 16/9535 |

FOREIGN PATENT DOCUMENTS

| | | | |
|---|---|---|---|
| JP | 2015-169958 | | 9/2015 |
| JP | 2018-041459 | | 3/2018 |
| WO | WO 02/057986 | | 7/2002 |
| WO | WO-2021211437 | A1 * | 10/2021 ............ G06F 30/12 |

OTHER PUBLICATIONS

Yumer et al, "Semantic Shape Editing Using Deformation Handles" SIGGRAPH, Aug. 2015, 12 pages.
PCT International Search Report and Written Opinion in International Appln. No. PCT/US2021/026853, dated Jul. 26, 2021, 15 pages.
International Preliminary Report on Patentability in International Appln. No. PCT/US2021/026853, dated Oct. 27, 2022, 10 pages.
Notice of Allowance in Japanese Appln. No. 2022-554664, dated Sep. 4, 2023, 5 pages (with English translation).
Office Action in Canada Appln. No. 3,175,045, dated Oct. 23, 2023, 5 pages.

* cited by examiner

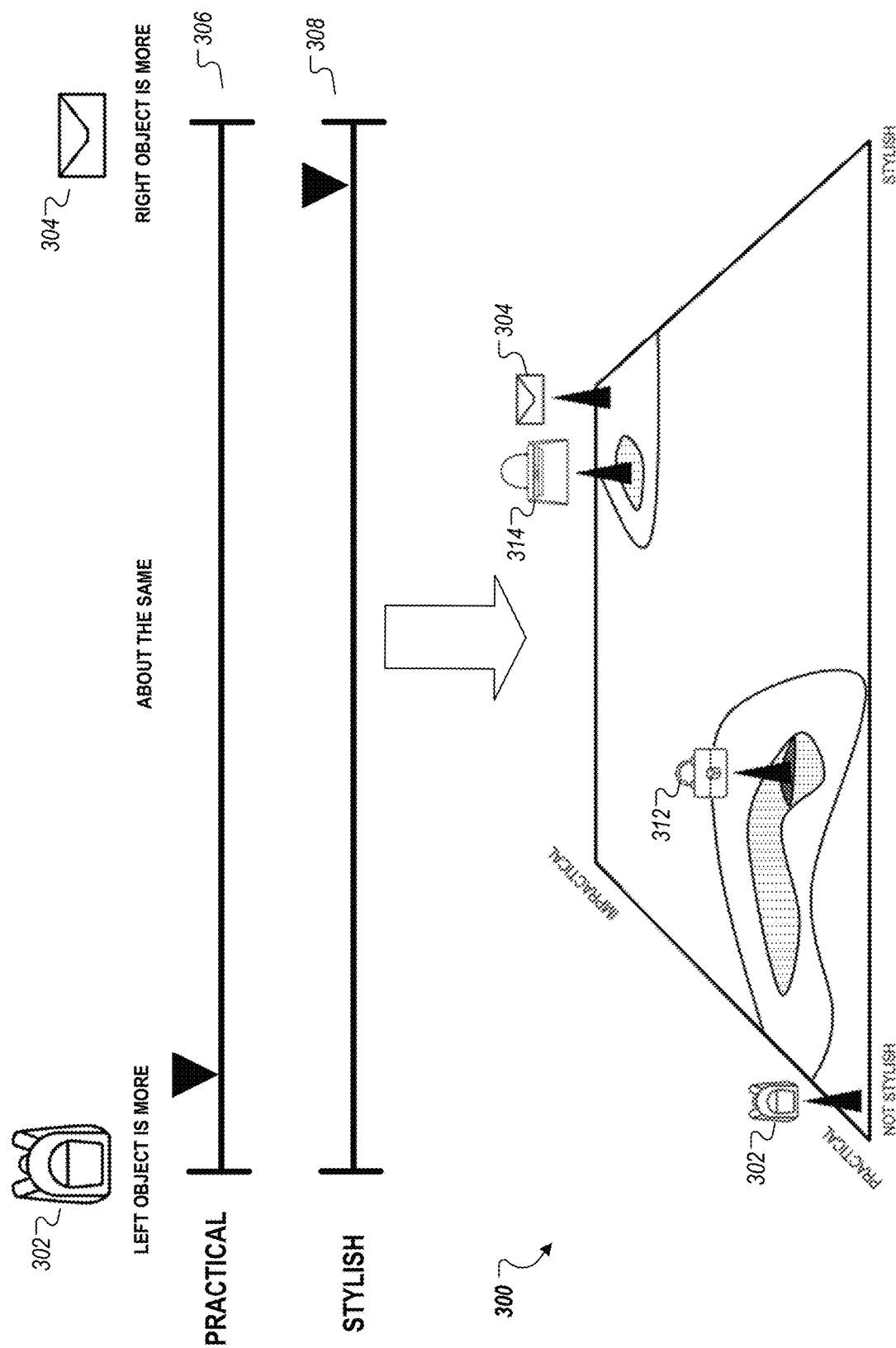

ND INTELLIGENTLY
AUTOMATICALLY AND INTELLIGENTLY EXPLORING DESIGN SPACES

CROSS-REFERENCE TO RELATED APPLICATION

This application claims the benefit of U.S. Provisional Application No. 63/010,438, filed Apr. 15, 2020, the contents of which are incorporated by reference herein.

BACKGROUND

This document relates to providing a data collection and model generation process that continuously reduces bias introduced by using data points from an unevenly distributed or unrepresentative population and explores design spaces.

SUMMARY

In general, one innovative aspect of the subject matter described in this specification can be embodied in a method for generating new product designs that includes receiving, from a user device, a request for a digital component for presentation at the user device, receiving a data set of user-provided information regarding a particular product design, generating, based on the data set of user-provided information, a visual representation mapping design factors to a continuous shape representing potential product design geometry, segmenting the visual representation into a plurality of segments based on the design factor values, selecting a segment of the visual representation that contains less than a threshold amount of data points, selecting a digital component that solicits information from a user, dynamically altering, based on the selected segment of the visual representation, a presentation of the digital component that solicits information from the user about the segment of the visual representation that contains less than the threshold amount of data points, distributing, for presentation at the user device, the dynamically-altered digital component, obtaining, from the user device and by way of a feedback mechanism, feedback information regarding the segment of the visual representation that contains less than the threshold amount of data points, modifying a design factor of the particular product design based, at least in part, on the feedback information obtained from the user to create a modified product design.

These and other embodiments can each optionally include one or more of the following features.

In some implementations, the method includes selecting, for the particular content item that solicits information from the user, a format in which the information is solicited, and verifying, based on the selected segment of the visual representation, the information that is solicited by the particular content item that solicits information from the user. In some implementations, selecting a format in which the information is solicited includes selecting a particular feedback mechanism to be provided with the dynamically-altered digital component.

In some implementations, the method includes determining, based on the request for the digital component for presentation at the user device, that the user of the user device is in a first group of users, where the request for the digital component for presentation at the user device indicates user demographic information of the user of the user device. The method can include receiving, from a second user device, a request for a digital component for presentation at the second user device that indicates user demographic information of a user of the second user device, determining, based on the request for the digital component for presentation at the second user device, that the user of the second user device is in the same first group of users as the user of the user device, and in response to determining that the user of the second user device is in the same first group of users as the user of the user device, providing the modified product design rather than the particular product design.

In some implementations, segmenting the visual representation into a plurality of segments based on the design factor values includes dividing, based on the design factor values, the visual representation into a plurality of segments such that each segment of the visual representation shares design factor values within a defined range of values.

The user interface element can be, for example, an image, audio, or video representation of a product or brand, a feedback mechanism, a theme of the task, and/or a wording of the task, among other elements. For example, data quality processor 120 can determine that the user of user device 106 is in a cluster of users interested in the product design of a handbag and identify a visual theme of the task to be altered. In some implementations, data processor 120 can alter the user element by replacing it. In some implementations, data processor 120 can alter the user element by modifying the element. For example, data quality processor 120 can alter the visual theme of the task by adding elements that are specific to a particular product design that the user is determined to be interested in, including a logo of a particular brand of handbag, a color scheme that evokes the particular brand of handbag, an audio track used by the particular brand of handbag, among other elements.

In some implementations, dynamically altering the presentation of the digital component includes determining, based on the request for the digital component for presentation at the user device, that the user of the user device is in a first group of users, wherein the request for the digital component for presentation at the user device contains information indicating one or more attributes of the user, identifying, based on determining that the user of the user device is in the first group of users, a user interface element of the digital component, and altering the user interface element of the presentation of the digital component.

In some implementations, the visual representation mapping design factors to a continuous shape representing potential product design geometry is invertible such that the generating, based on the data set of user-provided information, the visual representation mapping design factors to a continuous shape representing potential product design geometry comprises generating the visual representation by mapping potential product design geometry to design factors.

In some implementations, the method includes identifying, based on the modified product design and from a plurality of existing product designs, a closest existing product design that has a number of design factor values in common with the modified product design.

In some implementations, the method includes providing the modified product design to an integrated manufacturing system.

In some implementations, the method includes building, based on the feedback information, a behavioral model that predicts user reception of potential product design geometry, where modifying a design factor of the particular product design is based, at least in part, on the behavioral model.

In some implementations, the particular product design is a user interface design for a software application.

In some implementations, dynamically altering the presentation of the content item includes using machine learning or artificial intelligence techniques to specify information to be requested by the digital component.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. In certain environments, there has previously been no way to automatically and systematically reduce bias in data sets that are unrepresentative of a population or determined to be lacking data in a particular segment, and that shortcoming is addressed by the techniques, devices, and systems discussed herein.

In some implementations of this new system, underrepresented segments of a population for which data is collected are identified and tasks are generated for distribution to users in these segments. These tasks solicit responses regarding specific topics or areas from users such that the responses supplement existing data sets. For example, the system can determine that there is less than a threshold amount of responses regarding a preferred choice between two products from users in a particular age range and then generate tasks for distribution to users in this age range that ask a user to choose between the two products. These responses are received and processed by the system as an addition to the existing data set, thus improving data quality. The system continually monitors the data set, providing a solution that automatically maintains data quality even when the data set is updated.

This new system has access to a complex data processing infrastructure that cleans, processes, and maintains a comprehensive set of labelled, searchable data that can be used across many different situations to improve the results of models where there was previously no solution for automatically improving data quality and maintaining data quality as more data is gathered. If a model is using an incomplete or unrepresentative data set, the model can produce results that are not representative of the population's actual behavior. The new system automatically supplements the data set from which the model draws, improving the robustness of the data and the accuracy of the model's results. By automatically identifying population segments for which not enough, or an unrepresentative amount, of data exists, the system reduces biases in data sets that are used as inputs into various models. These more robust data sets in turn improve the reliability and accuracy of the results of the models that rely on the data. The improved data sets can be labelled and used by different parties, including content providers and product manufacturers that may not have the infrastructure for or access to the labelled and searchable data set that the system maintains.

In addition to improving the data sets, the system is able to automatically explore design spaces. Design spaces are conceptual representations of design values and can be referred to as continuous shapes. A design space can be associated with a particular product or service and can be multidimensional, representing possible design values of parameters of interest. In some implementations, design spaces can be augmented to map design parameters to semantic values. For example, the system can create models using a mapping of semantic attributes and geometric features of a product; these models exist within a single, continuous shape space that represents the universe of possible attribute values. Designs can be based on one or more sensory features. For example, designs can be visual, aural, tactile, scent-based, or taste-based. For example, a design for a car seat can include visual and tactile features.

This new system can automatically explore design spaces by identifying segments of a design space for which little or no data exists and generating tasks to be distributed to users regarding the identified segments. By gathering data for these segments, the system allows for previously unexplored designs to be taken into consideration. For example, the system can automatically generate designs having parameter values that have not been presented to users for feedback. Based on the feedback received, the system can continually update existing designs and generate new designs for which user feedback is solicited prior to the prototyping, manufacturing, and distribution phase. This feedback can be provided as input to models that output, for example, predictions of user preferences. The system can determine, based on data analysis and the output of behavioral models, directions in which to steer product designs and allows content providers, product designers, and manufacturers to focus on designs that are most likely to be well-received by a target segment of consumers. In other words, the improved update process can reduce the number of feedback cycles necessary to finalize a product design, thus reducing the computing resources needed for a complete design cycle, from initial data gathering through finalizing a design.

Leveraging this method allows for rapid design development of products that more accurately and dependably meet consumer demand and expectations across various demographics. Further, the improved update process provides efficiencies in design systems by improving data quality and reducing the number of feedback cycles needed to gather user data for input to a behavioral model. This system provides an avenue for product designers, developers, and manufacturers to receive diverse feedback on a global scale quickly and determine user preferences as a function of demographic data prior to the manufacturing and shipping phases, which require heavy expenditure of resources. This method may allow design and manufacturing to be personalized for individuals or segments of users. For example, this approach can be used by the manufacturer to review individual preferences to gauge acceptance statistics of a larger market.

The techniques described in this document enable a system to use fewer resources and perform fewer operations to generate high quality data relevant to a specific product or service. By automatically detecting and reducing bias in data sets, the system enables models using the data to provide more accurate and reliable results. Additionally, the system reduces the amount of resources needed to complete the design of a new product or service by allowing targeted exploration of design spaces and continuous improvement of data quality.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows an example data flow of the data quality improvement process.

Like reference numbers and designations in the various drawings indicate like elements.

DETAILED DESCRIPTION

This document describes methods, systems, and devices that improve data quality, reducing inherent biases, and allow for automatic, intelligent design space exploration. A model is only as accurate and representative of a population as the input data provided to the model. The proposed system improves the quality of data that can be provided to various systems for modelling and product development. User feedback data and behavioral data can be gathered in various ways.

In some implementations, the system generates tasks that are distributed to users. Each task can be a question, task, or other form of solicitation of input from a user. The user's input can be labelled and used as part of a comprehensive database that can be used in different contexts. For example, users can be presented with a task to complete in which the user must select a single logo design from among multiple logo designs that looks most appealing. The user's selection can then be labelled with the user's demographic information and stored as part of a labelled, searchable database. The system can determine, based on analyzing a set of labelled data, that data from a particular user demographic or regarding a particular product segment is missing, insufficient, or unrepresentative of the known population and automatically generate tasks or questions to gather more data and reduce the inherent biases in an unrepresentative data set. The supplemented set of labelled data can be provided as input to various models. For example, the labelled set of data can be provided to a behavioral model to predict whether a particular design will be appealing to a particular segment of users. Various models can be used to predict user reactions and reception of, for example, particular designs.

The system also allows for automatic and intelligent exploration of a particular design space. For example, the system can determine, based on analyzing a set of labelled data, that data regarding a particular area of a design space is missing, insufficient, unrepresentative of the known population and automatically generate tasks or questions to gather more data. The system can explore design spaces by generating product designs based on an unexplored area of a design space using artificial intelligence and machine learning models. These artificially generated designs can then be presented to users along with a task soliciting feedback.

Figure 1:
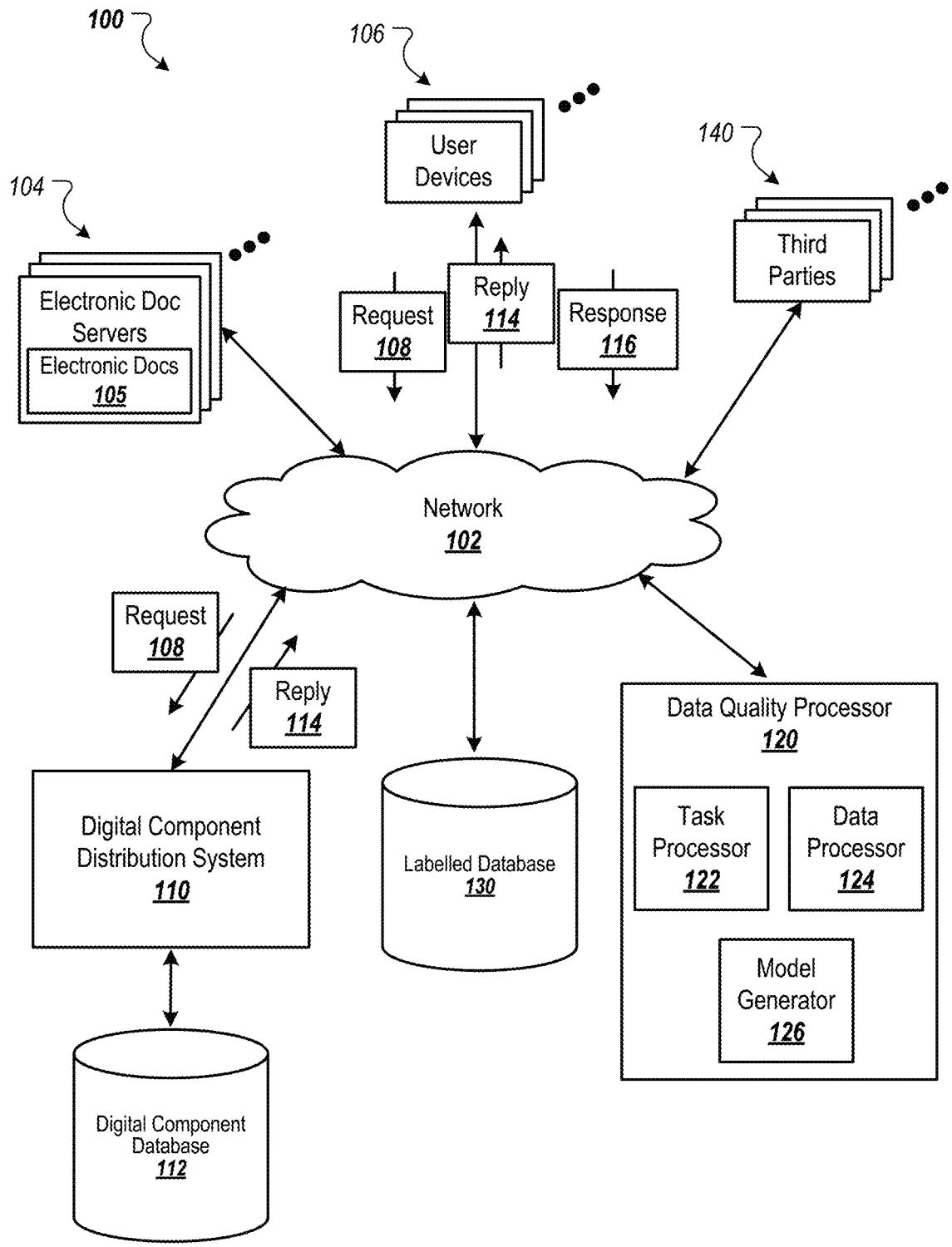
FIG. 1 is a block diagram of an example environment for data quality improvement and design space exploration.

FIG. 1 is a block diagram of an example environment 100 for data quality improvement and design space exploration. The example environment 100 includes a network 102, such as a local area network (LAN), a wide area network (WAN), the Internet, or a combination thereof. The network 102 connects electronic document servers 104 ("Electronic Doc Servers"), user devices 106, and a digital component distribution system 110 (also referred to as DCDS 110). The example environment 100 may include many different electronic document servers 104 and user devices 106.

A user device 106 is an electronic device that is capable of requesting and receiving resources (e.g., electronic documents) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

One or more third parties 140 include content providers, product designers, product manufacturers, and other parties involved in the design, development, manufacturing, marketing, or distribution of products or services.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request. The request 108 is transmitted, by the user device 106, over the network 102 (e.g., a telecommunications network) to a server of the DCDS 110.

The request 108 can include data specifying the electronic document and characteristics of locations at which digital content can be presented. For example, data specifying a reference (e.g., URL) to an electronic document (e.g., webpage) in which the digital content will be presented, available locations (e.g., digital content slots) of the electronic documents that are available to present digital content, sizes of the available locations, positions of the available locations within a presentation of the electronic document, and/or media types that are eligible for presentation in the locations can be provided to the DCDS 110. Similarly, data specifying keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information indicating a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include age, gender, geographical location, education level, marital status, household income, occupation, hobbies, social media data, and whether the user owns a particular item, among other characteristics.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Data specifying characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be presented with the given electronic document in response to receiving the request 108 and/or using information included in the request 108. In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

In some implementations, digital components from digital component database 112 can include content provided by third parties 140. For example, digital component database 112 can receive, from a third party 140 that uses machine learning and/or artificial intelligence to navigate public streets, a photo of a public intersection. In another example, digital component database 112 can receive, from a third party 140 that provides services to bicycle riders, specific questions to which third party 140 would like responses from users.

The identification of the eligible digital content can be segmented into multiple tasks that are then assigned among computing devices within the set of multiple computing devices. For example, different computing devices in the set of multiple computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106. The digital content distributed by DCDS 110 and represented by reply data 114 can include, for example, digital content that solicits input from users. This input can be analyzed, labelled, and stored as part of a comprehensive database, such as labelled database 130. Labelled database 130 stores labelled data that has been analyzed and categorized. Labelled database 130 can be searched and can store data related to users, including user demographic information, user response data, and other user characteristics. For example, labelled database 130 can store and associate a user's anonymized demographic information in association with the user's response to a question previously presented to the user. The input from users is transmitted as response data 116 from a user device 106 to data quality processor 120.

A data quality processor 120 generates such digital content that solicit user input, receives and processes the user input data, and generates and modifies design spaces and designs. Data quality processor 120 includes a task processor 122, a data processor 124, and a model generator 126. Task processor 122 generates the tasks to be distributed to users. Data processor 124 analyzes and labels the input received in response to the tasks. Model generator 126 generates and modifies design spaces and designs based on labelled data and input from third parties such as content providers, product designers, and manufacturers, among other parties. For ease of explanation, task processor 122, data processor 124, and model generator 126 are shown in FIG. 1 as separate components of data quality processor 120. Data quality processor 120 can be implemented as a single system on non-transitory computer-readable media. In some implementations, one or more of task processor 122, data processor 124, and model generator 126 can be implemented as integrated components of a single system.

Task processor 122 creates digital content that solicits input from users, or tasks. Task processor 122 is in communication with the DCDS 110, the electronic doc servers 104, and the third parties 140. Data quality processor 120 can gather data from tasks issued directly by task processor 122 or from tasks issued by third parties, such as third parties 140, that provide data quality processor 120 with access to its data sources. Tasks can include content with varying levels of interaction required, ranging from activities that ask a user to draw a picture to questions that simply ask a user to select an answer to a single-click activity that asks the user to grant the system permission to access the user's data. In some implementations, the tasks can include questions from which a user's answer input is requested. For example, a task presented to a user can include the question "Do you prefer chocolate or vanilla ice cream?" and the user can either input their answer or select from pre-selected answers. In some implementations, the tasks can include an activity that requires more involvement on the user's part. For example, a task presented to a user can ask the user to select one or more portions of an image of a traffic intersection that include a bicycle, and the user can click or otherwise indicate the appropriate portions. In some implementations, the tasks can include authentication protocol challenges such as CAPTCHAs or reCAPTCHAs.

In addition to generating tasks that are served to users, task processor 122 can modify tasks. For example, task processor 122 can modify a task that has previously been served to one or more users and modify the task to gather different data, to ask a more targeted question, or to otherwise change the direction of the task. Task processor 122 and its outputs are described in further detail below.

Data processor 124 receives and processes data to identify missing, inaccurate, underrepresented, or unrepresentative data and automatically determine data quality improvement solutions. Data processor 124 analyzes a particular data set and determines, based on design guidelines and other input whether the existing data meets a quality threshold. Data processor 124 can process response data received from a user device and existing response data. For example, data processor 124 can determine whether existing user-response data stored in labelled database 130 regarding a particular camping backpack design includes a representative number of responses from consumers between the ages of 45 and 54 by determining the proportion of the responses received from consumers in this age demographic to consumers in other age demographics and comparing the existing ratio to expected or real-world ratios for the target market for camping backpacks. Data processor 124 can also determine whether design values within a design space have been explored or whether there is sufficient data regarding those values. For example, data processor 124 can determine whether a particular size of trackpad on a laptop has received a sufficient number of user responses by comparing the existing number of user responses to a threshold amount of user responses.

Data processor 124 can also receive and extract data collected from the digital content distribution process. For example, data analyzer 124 can receive request data 108 and reply data 114 to determine the population and characteristics of users represented by cookies indicated in request data 108 and reply data 114. Data analyzer 124 can store the demographic and other characteristic data in a database such as labelled database 130. In some implementations, data analyzer 124 can retrieve data that has been analyzed and labelled by other systems from labelled database 130. Data analyzer 124 can, for example, retrieve data from labelled database 130 that indicates demographic data of users who provided request data 108 and received reply data 114. Data processor 124 can segment data, for example, based on user demographic information. Data processor 124 and its outputs are described in further detail below.

Further to the descriptions above, a user may be provided with controls allowing the user to make an election as to both if and when systems, programs, or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Model generator 126 generates, modifies, and maintains design spaces and models. Model generator 126 can generate design spaces and/or models based on data provided by data processor 124 or retrieved from labelled database 130. For example, model generator 126 can generate behavioral models that predict user preferences regarding a particular design based on the data provided by data processor 124. Behavioral models map subjective factors to continuous semantic shapes as a function of demographic, creating a design space that can be used to optimize a design within specific constraints.

The output of such models can range from a specific design to a predicted user response to a specific design. Model generator 126 and its outputs are described in further detail below.

The techniques described below enable a system to continually and automatically improve data quality and explore design spaces.

Figure 2A:
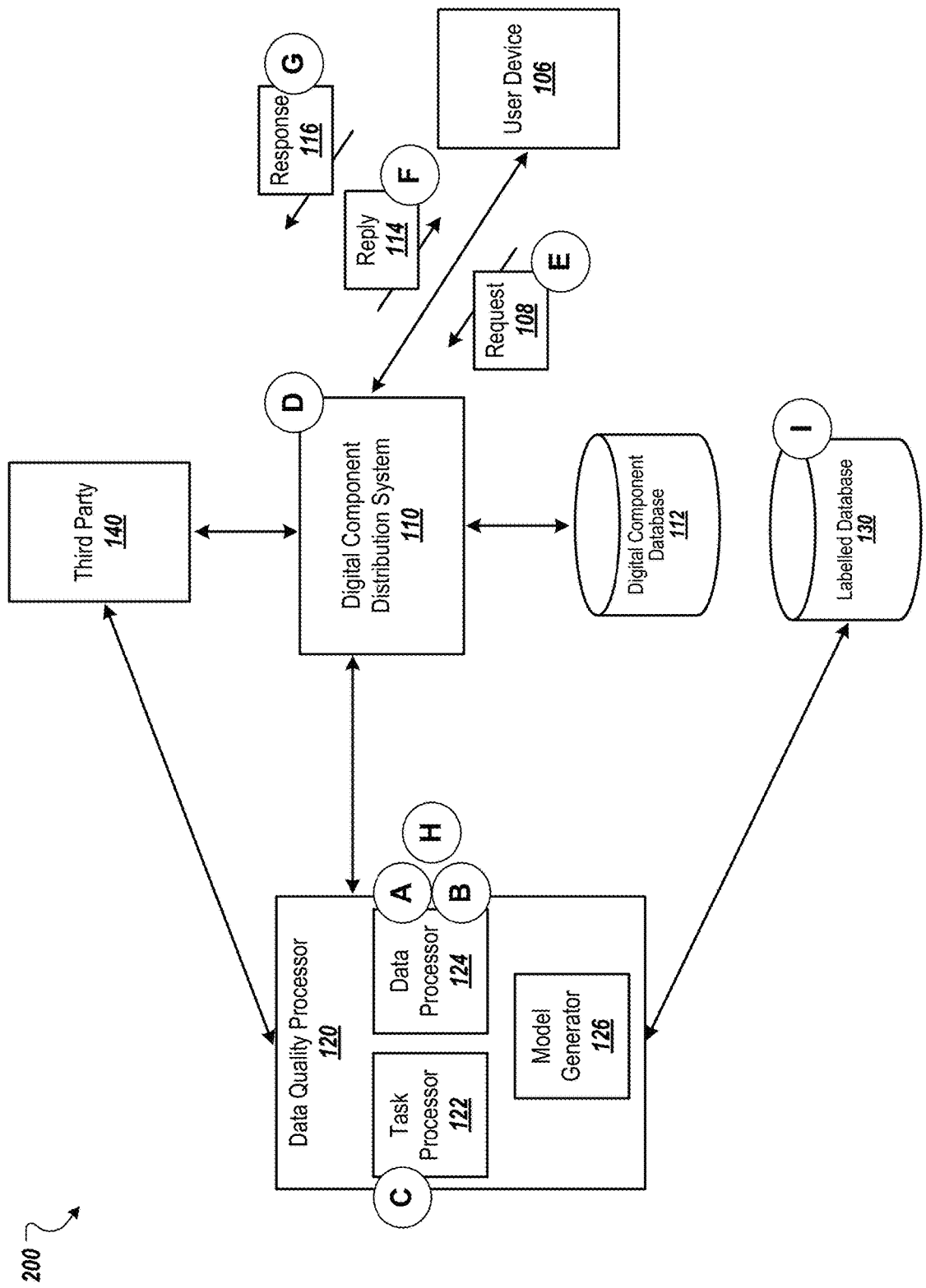
FIG. 2A shows an example data flow of the data quality improvement process.

FIG. 2A shows an example data flow 200 of the data quality improvement process in the example environment of FIG. 1. Operations of data flow 200 are performed by various components of the system 100. For example, operations of data flow 200 can be performed by data quality processor 120 in communication with DCDS 110, user device 106, third party 140, and labelled database 130.

The flow begins with step A, in which data processor 124 of data quality processor 120 analyzes and segments a set of data associated with a population of users. In some implementations, the set of data is existing data retrieved from labelled database 130. For example, the set of data can include a set of user input in response to a reCAPTCHA that asks users to select, from a grid of photos, all squares that show a portion of a type of vehicle, such as a bicycle. In another example, the set of data can include a set of user input in response to a question asking users how much they typically spend on dog food on a monthly basis. The user input can be associated with user characteristic data of users who provided the input. For example, user characteristic data can include demographic data and browsing history, among other data to which system 100 has access and for which system 100 has permission to use. In another example, the set of data can include a set of user input in response to a question asking users to rate how likely they would be to purchase a particular handbag product design across a range of handbag designs mapped to subjective descriptors, such as "practical" or "stylish."

Data processor 124 segments data based on various parameters, including user characteristic data. For example, data processor 124 can divide the set of data into segments based on user age, user location, and/or user interests, among other user characteristic data to which system 100 has access and for which system 100 has permission to use. In another example, data processor 124 can segment data based on characteristics of the data itself. For example, data processor 124 can divide the set of data based on the value of a particular subjective factor of a product design, such as how "stylish" a handbag product design is perceived to be based on a user-provided feedback.

The flow continues with step B, in which data processor 124 identifies a segment of the set of data that is insufficient according to one or more metrics. In some implementations, the metric is provided by a third party 140 such as a product designer. For example, the metric can be a number of user responses and a target demographic of the users who respond. In some implementations, the metric is automatically determined. For example, the metric can be a threshold difference in population proportions of users who responded, where a data set having a difference in population proportions larger than the threshold difference could be considered unrepresentative of the actual population from which responses are solicited. In one example, data processor 124 can identify the bicycle detection segment of a set of vehicle detection as having insufficient granularity.

The flow continues with step C, in which task processor 122 dynamically alters, based on the identified segment, a task to be presented to a user. In some implementations, task processor 122 dynamically alters an existing task that has previously been generated and/or presented to a user. In some implementations, task processor 122 generates a completely new task to be presented to a user. Task processor 122 can perform this alteration in real-time in response to identifying a segment. For example, data quality processor 120 can continually monitor the quality of a data set and update its metrics based on new and updated information received.

In one example, task processor 122 automatically alters an aspect of a previously distributed task that asked users to select all squares containing a portion of a bicycle by modifying the grid system to use smaller squares to provide better resolution. In step B, data processor 124 automatically determined that more granularity was needed, and using this information, task processor 122 can divide up intersection photos having bicycles into smaller squares.

Data quality processor 120 automatically modifies or generates a new task based on the analysis of existing data sets, and performs additional operations that aid in generating the task. For example, data quality processor 120 can determine that a modified task includes providing a user with photo data of an intersection having bicycles in view. Data processor 122 can receive specific photo data of intersections from third party 140. Data processor 122 can also automatically source data to be provided as part of the task. For example, data processor 122 can retrieve photo data labelled as a public intersection having at least one bicycle in view from, for example, labelled database 130. Data processor 122 can then perform data cleansing operations, including scrubbing the data of personally identifying information, cleaning the data, and adjusting the data such that the data is usable, among other operations. For example, data processor 122 can adjust a live stream of photos from a street camera trained on a public intersection, by filtering out images that do not include a bicycle in view, adjust lighting, and creating more dynamic range in the images, among other operations. Data processor 122 can perform complex data manipulation operations, including removing objects obstructing another object and enhancing the focus of a particular object, among other operations.

Task processor 122 can also determine, based on the identified segment, one or more distribution parameters that must be satisfied prior to distribution of the task. The distribution parameters can include user characteristics that a user must have in order to be served with the task. For example, the distribution parameters can include the particular demographic of women between the ages of 18 and 24 who live on the West Coast of the United States.

Task processor 122 can alter the task to, for example, sample existing or new areas of the space of image, video, or audio objects within labelled database 130. Task processor 122 can also test the removal or addition of brand information to evaluate, for example, user reactions or user biases with respect to a brand.

The flow continues with step D, in which task processor 122 transmits the dynamically altered or generated task to DCDS 110 for distribution to users. For example, task processor 122 can transmit task data indicating the task to be presented to a user and content to be presented to the user as part of the task. Task processor 122 can include distribution parameters that must be satisfied in order to distribute the task to a particular user. For example, task processor 122 can include demographic data of a target user to whom the task can be presented.

The flow continues with step E, in which DCDS 110 receives request 108 for content from user device 106. Request 108 is transmitted by user device 106 to DCDS 110 when the client device interacts with digital content. For example, if a user of user device 106 clicks a link to download a shopping application, the link can cause user device 106 to transmit a request 108 to DCDS 110. The request 108 can include interaction tracking data from the client device 106. For example, the request 108 can include tracking data such as an indication of the interaction, the digital content with which user device 106 interacted, and an identifier that uniquely identifies user device 106. In some implementations, the request 108 includes an indication of the provider of the digital content and the location of the destination server that hosts the requested resource.

The flow continues with step F, in which DCDS 110 transmits reply data 114 to user device 106. As described above, reply data 114 can indicate the task to be distributed to the user satisfying the particular distribution parameters in addition the requested electronic document. Reply data 114 is transmitted by DCDS 110 to user device 106 in response to DCDS 110 receiving request 108 and determining, based on the received distribution parameters and user data indicated in request 108, that the distribution parameters are satisfied. For example, DCDS 110 can determine, based on receiving request data 108, that the user of user device 106 is a 22 year old woman who lives in Oregon, and thus the distribution parameters are satisfied. DCDS 110 can then transmit the requested electronic document and the dynamically altered task to user device 106 in the form of reply data 114.

The flow continues with step G, in which DCDS 110 receives response data 116 from user device 106. Response data 116 is transmitted by user device 106 to DCDS 110 in response to the user of user device 106 completing the task provided in reply data 114. Response data 116 includes user information, such as demographic data, device data, information regarding the user's response, and includes the user's input in response to the task provided in reply data 114. For example, response data 116 can include the user's selection of squares that contain a portion of a bicycle, the amount of time it took for the user to make the selections, her pattern of mouse movements, and her anonymized demographic data, device data, and browsing history, all of which she has given permission to system 100 to access. The response data can include semantic descriptors, provided by the user, regarding a task, product, or design. Semantic descriptors can include any descriptors that provide semantic information about an object, such as a product or design. Semantic descriptors can be generated by humans or artificial intelligence, and can take the form of words (e.g., keywords or key phrases), sentences, symbols, or other descriptors that convey semantic information. Additionally, semantic descriptors can be assigned to an object based on other actions, such as interacting with presented information (e.g., photos or icons), interacting with rating elements (e.g., product rating tools), or submitting free form text feedback about an object. DCDS 110 can then provide this data to data processor 124 for analysis and labelling.

The flow continues with step H, in which data processor 124 analyzes response data 116 from user device 106. Data processor 124 can analyze response data 116 to categorize the data and label the data with the user's information such that the data becomes searchable. For example, data processor 124 can label the user's selected squares with her demographic information, the amount of time that it took her to make the selections, and the accuracy of her selections as compared with a ground truth set of squares.

The flow continues with step I, in which data quality processor 120 provides the analyzed data to labelled database 130. Data processor 124 can provide the labelled data for storage in labelled database 130, such that the data is searchable.

System 100 can continually perform process 200 such that data quality processor 120 is automatically and continuously monitoring the quality of the data included in a particular data set. Thus, system 100 maintains and improves the quality of data across the comprehensive database 130 such that the accuracy and integrity of model output results are continually improved. Because system 100 continually updates labelled database 130, the system provides for a searchable database from which system 100 can retrieve content, such as images, audio, or video instances based on user response information, such as the result of a task, and user information.

The system reduces bias in the distribution of user feedback by selectively soliciting additional feedback from user demographics that are underrepresented or not represented at all.

Figure 2B:
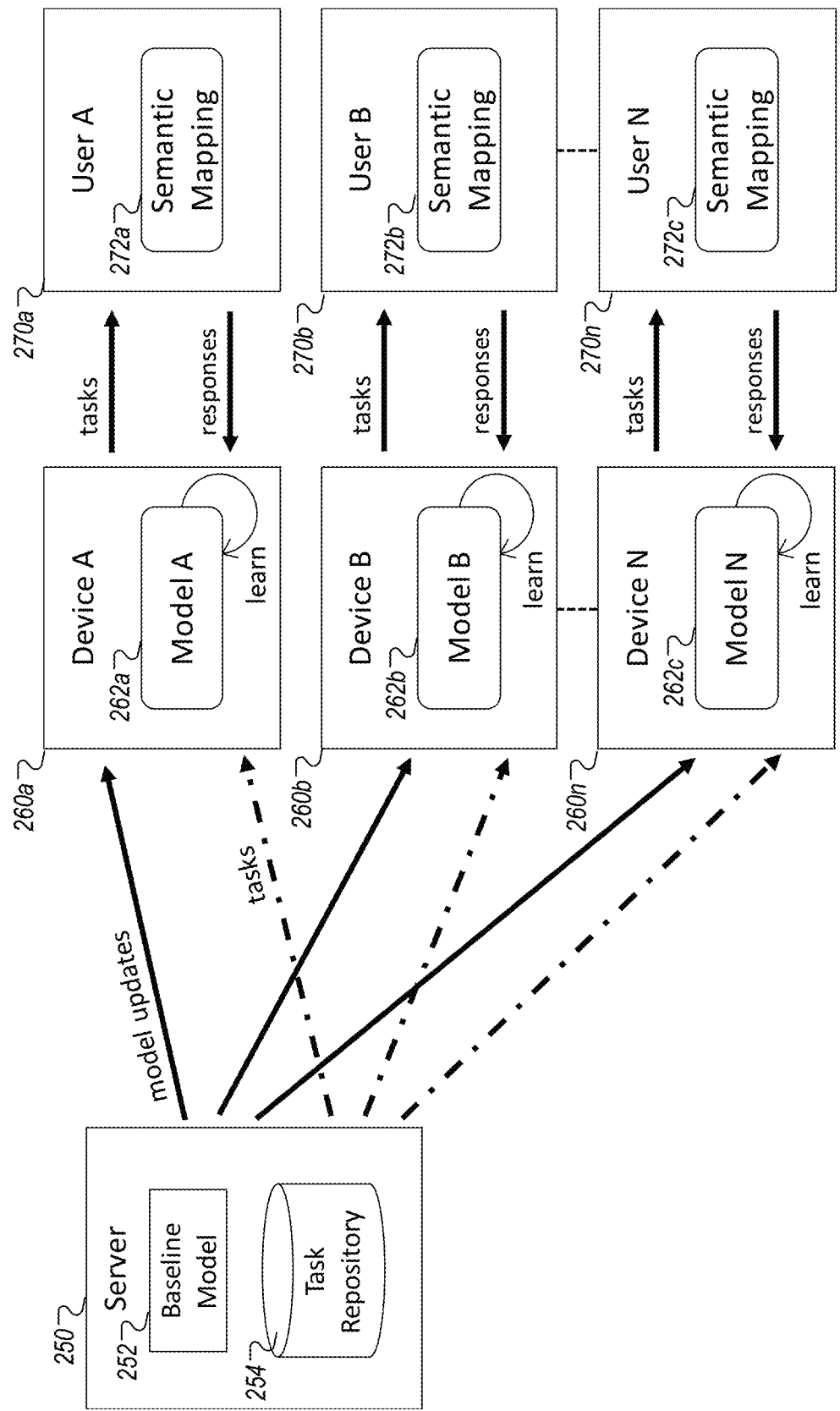
FIGS. 2B and 2C depict model training processes.
Figure 2C:
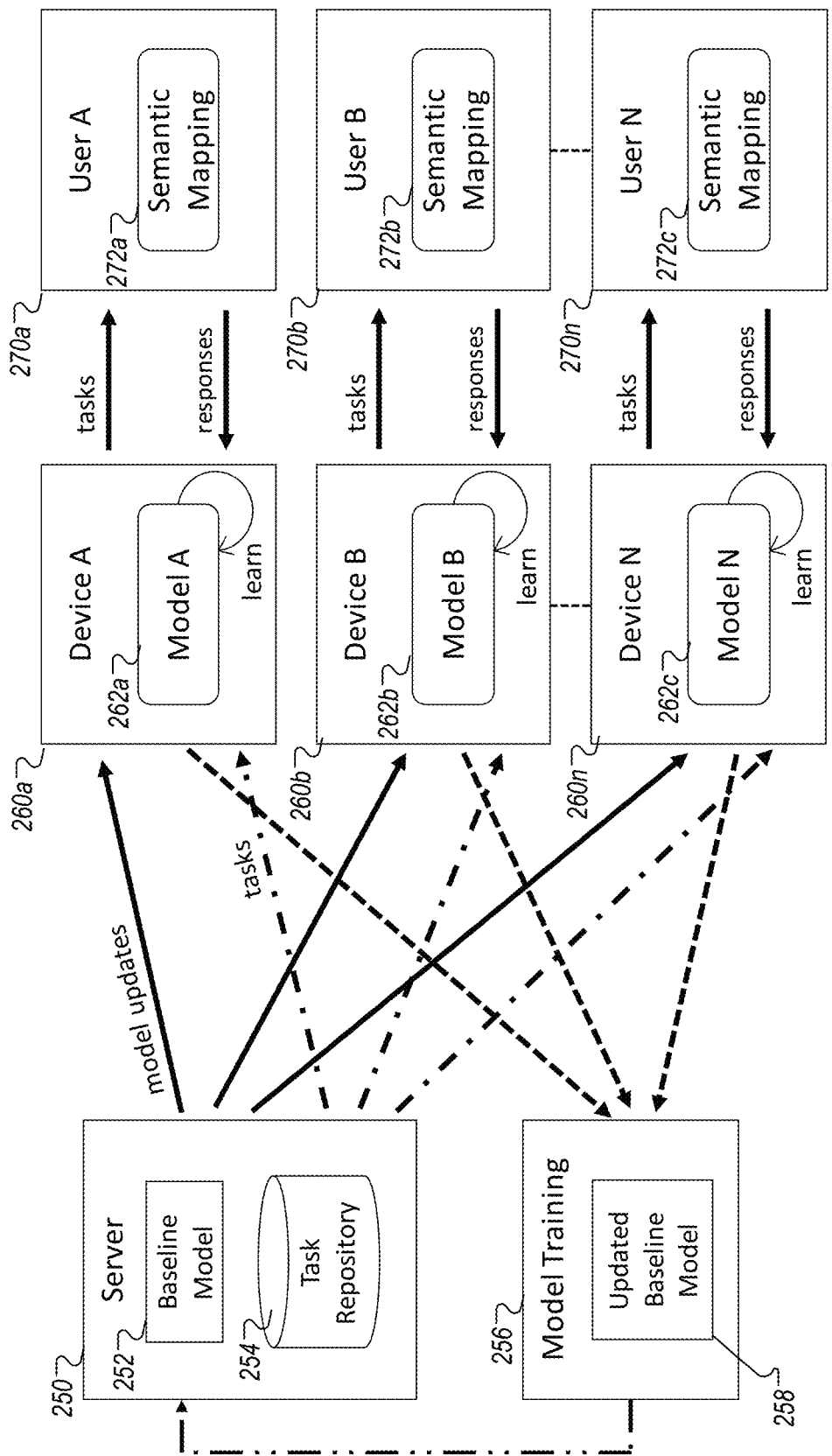

FIGS. 2B and 2C depict model training processes. Server 250 maintains baseline model 252 and task repository 254. Baseline model 252 is a model that serves as a baseline behavioral model and can be updated. Task repository 254 maintains a set of tasks that can be distributed to users.

Devices A 260a, B 260b, . . . and N 260n (collectively referred to as devices 260) each include models A, B, N 262a, 262b, 262n, respectively (collectively referred to as models 262). Locally maintained models 262 can each be updated and improved based on tasks and model updates provided by server 250.

Each of devices 260n receives input from, displays information to, and can be controlled by a user 270a, 270b, . . . 270n (collectively referred to as users 270). For example, devices 260 can provide to each of users 270 a task as described above. The tasks can be provided from, for example, task repository 254. Each of the users 270 can provide, to devices 260, a semantic mapping 272a, 272b, . . . 272n (collectively referred to as semantic mappings 272) in response to the tasks. Based on the responses provided by the users 270, the devices 260 can update the models 262.

In FIG. 2C, model training module 256 can generate an updated baseline model 258 based on information from the responses provided by the users 270 and provide the updated baseline model 258 to server 250 to replace or updated baseline model 252.

FIG. 3 illustrates an example design space 300. Design space 300 is a visual representation of the conceptual universe of possible design values. Design space 300 can be generated by a system such as system 100, illustrated in FIG. 1. For example, model generator 126 of data quality processor 120 can generate design space 300 based on user response data from labelled database 130.

Design space 300 can be multidimensional. In this particular example, design space 300 includes two dimensions and was generated as a result of user-submitted data in response to a question asking users to rate various bag designs. In other examples, design space 300 can include more than two dimensions, and can be represented as a three or more dimensional model. Dimensions include design features such as shape, color, texture, size, or relative distance to another object, among other features.

Design space 300 is used to visually represent all possible designs for a particular product or service. Products can include non-durable consumer goods and durable consumer goods. For example, products can include clothing, cosmetics, food, furniture, and automobiles, among other items.

Design space 300 can be limited by various constraints ranging from whether a design is physically possible to create to the design's ease of manufacturing to designer-mandated constraints. Design space 300 can be limited by data collected from users such as the target audience for the product. For example, if the target population of consumers for a particular mobile device will not carry around the mobile device if it weighs over three pounds, design space 300 can be limited in its weight dimension. In some implementations, design space 300 can be automatically limited by data and decisions made by system 100. For example, data processor 124 can determine, based on user response data from labelled database 130, that none of the users surveyed are interested in a laptop with a screen smaller than eight inches and data processor 124 can provide this limitation to design space 300 to model generator 126.

By automatically generating and modifying design space 300, this new system reduces the amount of time and resources used to arrive at a final design. The system can focus design exploration in areas that are most likely to be fruitful by a metric specified by an interested third party. For example, data quality processor 120 can automatically focus design exploration of bag designs in areas that are mostly likely to be purchased by consumers between the ages of 25 and 34, a target demographic of a third party bag designer and manufacturer 140. Data quality processor 120 can focus requests for user response data toward bag designs indicated to be of greatest interest to surveyed users aged 25-34 by automatically generating bag shapes and designs that fall within design space 300 most likely to be of interest to the users.

In this particular example, design space 300 maps semantic attributes to geometric features of designs that fall within the space. For example, design space 300 maps the semantic attributes "practical" and "stylish" to particular shapes and forms of bag designs, including bag designs 302 and 304. These semantic attributes are subjective factors that represent specific qualitative design targets and demographics. Based on user response data 306 and 308 from labelled database 130, data quality processor 120 has determined that users are most interested in bags that are a mixture of "practical" and "stylish." In this particular example, data processor 124 of data quality processor 120 has analyzed the user response data from labelled database 130 and determined that there is a large amount of interest in bags that are more "practical" and at least somewhat "stylish." Using this determination, model generator 126 can limit design space 300 to focus on bag designs that are more than some threshold amount of "stylish" and some other threshold amount of "practical." Model generator 126 can, in some implementations, automatically generate designs that meet these design criteria without further input from a designer. In some implementations, model generator 126 can generate a bag design that meets the "stylish" and "practical" thresholds that has not been generated before. For example, model generator 126 can generate bag designs 312 and 314 without input from the third party bag designer 140 and designs 312 and 314 can be new, previously unknown bag designs.

Model generator 126 can generate new designs based on an initial set of input designs without additional information by, for example, using artificial intelligence and machine learning techniques to deform particular geometric features of existing designs to create new designs. In some implementations, model generator 126 can generate entirely new designs that do not use existing designs as a starting point. Data quality processor 120 can be integrated with design programs, including 3D modelling programs and computer aided design (CAD) programs to generate a new design or modify an existing design.

Model generator 126 can use statistical and/or machine learning models that accept user-provided information as inputs. The machine learning models may use any of a variety of models such as decision trees, generative adversarial network-based models, deep learning models, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, association rules, inductive logic, clustering, maximum entropy classification, learning classification, etc. In some examples, the machine learning models may use supervised learning. In some examples, the machine learning models use unsupervised learning.

In some implementations, probabilistic models can be used that define the probabilistic ranking of attributes given a product design or shape or a probabilistic ranking of product designs or shapes given one or more attributes.

Model generator 126 allows designers to explore new areas of design spaces that have previously been unexplored and reduces the amount of time and resource-intensive feedback cycles that need to be performed specifically for a particular product by automatically generating new designs based on user response data to increase the likelihood that the design will be well-received by users. Designers can then select a particular new design that can then be researched and tested. In some implementations, probabilistic ranking can be used to define a set of candidates that can then be tested in a future task for refinement of user preferences. The data gathering and design generation processes are described in further detail below. Model generator 126 allows system 100 to characterize behavioral requirements of users with respect to product designs as a function of market demographics.

Model generator 126 can use various types of models, including general models that can be used for all users and customized models that can be used for particular subsets of users sharing a set of characteristics, and can dynamically adjust the models based on the received user information for a particular user 102 or based on detected activity. For example, model generator 126 can use a base network for users and then tailor the model to each user.

In some implementations, model generator 126 can use machine learning to determine an objective function for a particular user based on subjective feedback from the user. The objective function can be simple and implement general modifications to a product design. As system 100 collects user response data, system 100 anonymizes the data and provides the data to a central database that stores and analyzes the collected data to improve general behavior models and allow system 100 to provide more individualized strategies for each user 102.

System 100 can, for example, utilize a general profile for a user of a particular age, location, interest, etc. System 100 can generalize support configurations across users who are predicted to have similar interests. In some implementations, system 100 accepts input, from a user, of profile information such as the user's age, location, and interests, among other parameters.

System 100 can utilize, for example, a "shoe size" model that is individualized to a certain extent. For example, system 110 can use general profiles for people within a particular age bracket, for people in New York, for people who like motorcycles, etc. For example, if multiple users indicate a similar preference, system 100 can determine whether a matching product exists. If a matching product exists, system 100 can return the product to a user. If a matching product does not exist, system 100 can modify an existing product design or generate a new design. In some implementations, system 100 can perform aggregate personalization or clustering by mapping a particular user to an existing cluster or segment of users or form a new cluster or segment of users. The system 100 can also be used to identify product or buying trends within particular users. In some implementation, system 100 can perform aggregate configuration clustering by mapping a user to an existing customer segment or product or map the user's preference to an existing feature set.

Additionally, each model can be individualized. For example, each model can be created from a generic model by altering model parameters based on the characteristics for each user determined from the collected data. Each model can vary for a particular user over long periods of time and short periods of time. For example, system 100 can track how interested a user is in a particular design element and adjust the behavioral model when the user is determined to have lost interest. In some implementations, each model can also be created from a model that has been individualized using a general profile and further altered for each user. For example, a model can be created by altering model parameters based on the characteristics for each user determined from the collected data.

In some implementations, models can be individualized without using a base model. For example, user response data can be input to model generator 126 and provided to a product designer, manufacturer, or design program to be mapped to a product configuration with no adjustments. In one example, model generator 126 allows a user to purchase a specific item immediately or to set up alerts when the specific item is available.

Figure 4:
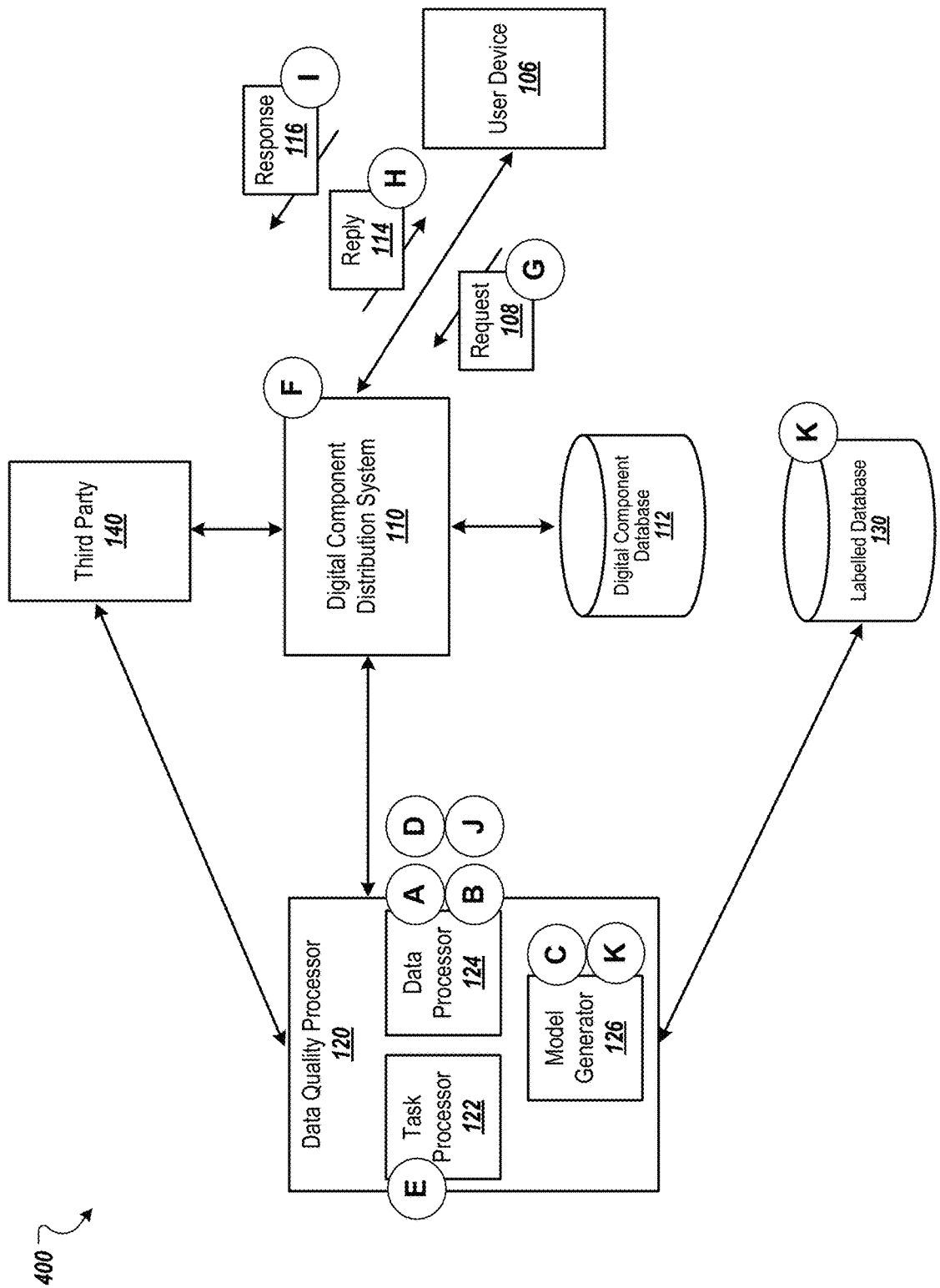
FIG. 4 shows an example data flow of the design space exploration process.

FIG. 4 shows an example data flow 400 of the design space exploration process in the example environment of FIG. 1. Operations of data flow 400 are performed by various components of the system 100. For example, operations of data flow 400 can be performed by data quality processor 120 in communication with DCDS 110, user device 106, third party 140, and labelled database 130.

The flow begins with step A, in which data processor 124 of data quality processor 120 analyzes and segments a set of data associated with a population of users. In some implementations, the set of data is existing data retrieved from labelled database 130. For example, the set of data can include a set of user responses to a question asking users to rate, on a sliding scale, two different bag designs with respect to two semantic descriptors. The user input can be associated with user characteristic data of users who provided the input. For example, user characteristic data can include demographic data and browsing history, among other data to which system 100 has access and permission.

The flow continues with step B, in which data processor 124 identifies a segment of the set of data that is insufficient according to one or more metrics. Details of this step can be found above in the description of FIG. 2A with respect to step B.

The flow continues with step C, in which model generator 126 generates the design space. As described above with respect to FIG. 3, a design space is a visual representation of the universe of possible designs. In some implementations, model generator 126 simply updates an existing design space that was provided by third party 140. For example, model generator 126 can receive a design space from a third party bag designer 140 and update the design space based on the set of data.

Model generator 126 can also generate a behavioral model that predicts user reception of a particular design. For example, model generator 126 can utilize artificial intelligence and/or machine learning techniques to generate a behavioral model that outputs an evaluation of the design space and portions of the design space that are most likely to be well-received by a particular population of users, does not have a sufficient number of data points, or does not have a representative proportion of users in a particular demographic segment, among other evaluations of particular metrics.

The flow continues with step D, in which data processor 124 uses the behavioral model to determine one or more segments of the design space to target. For example, data processor 124 uses the output of the behavioral model generated in step C by model generator 126 to determine that designs that are very "stylish" but also very "practical" do not have a threshold number of user reactions to the designs, or that such designs have not been generated.

The flow continues with step E, in which task processor 122 dynamically alters, based on the determined one or more segments, a task to be presented to a user. As described above with respect to FIG. 2A, task processor 122 can alter an existing task that has previously been generated and/or presented to a user or generate a completely new task to be presented to a user. For example, task processor 122 can generate a new bag design that is very "stylish" and also very "practical" to be presented to a user for feedback.

In some implementations, model generator 126 can display two or more product designs to allow a user to visualize the differences or deformation between two or more product instances that result from a model.

In some implementations, model generator 126 can be integrated with a computer aided generative design program and can improve, modify or alter the design of a product or service package through the integrated program.

The flow continues with step F, in which task processor 122 transmits the dynamically altered or generated task to DCDS 110 for distribution to users. Details of this step can be found above in the description of FIG. 2A with respect to step D.

The flow continues with step G, in which DCDS 110 receives request 108 for content from user device 106. Details of this step can be found above in the description of FIG. 2A with respect to step E.

The flow continues with step H, in which DCDS 110 transmits reply data 114 to user device 106. Details of this step can be found above in the description of FIG. 2A with respect to step F.

The flow continues with step I, in which DCDS 110 receives response data 116 from user device 106. Details of this step can be found above in the description of FIG. 2A with respect to step G.

The flow continues with step J, in which data processor 124 analyzes response data 116 from user device 106. Details of this step can be found above in the description of FIG. 2A with respect to step H.

The flow continues with step K, in which model generator 126 updates the design space and/or the behavior model based on the analyzed response data from user device 106. Model generator 126 can narrow or expand the design space based on feedback from users. For example, model generator 126 can discard a portion of the design space that has been determined to have a threshold number or percentage of user responses and has less than a threshold amount of positive responses. Model generator 126 can update the behavior model to reflect the updated data set. For example, model generator 126 can input the analyzed response data as input to train the behavior model that predicts user reception of a particular bag design.

Data quality processor 120 can also provide the analyzed data to labelled database 130. The model and design space updates can be performed simultaneously with the data quality processor 120's transmission of the analyzed data to labelled database 130. In some implementations, these portions of step K can be performed asynchronously.

System 100 can continually perform process 400 such that data quality processor 120 is automatically and intelligently exploring design spaces. Thus, system 100 allows for efficient design development, reducing the amount of time and resources required to generate and finalize a new design for a product or service.

The system as described above with respect to FIGS. 1 and 3-4 automatically alters tasks to provide data quality improvements. In some implementations, data quality processor 120 can alter tasks based on data indicating, for example, particular characteristics of the segments of the data itself, such as a lack of consistent responses to one or more types of designs, to different image locations, or to images having particular characteristics, among other factors. In some implementations, data quality processor 120 can alter tasks based on data indicating, for example, particular characteristics in user segments, such as a particular segment of users taking an unusually short of amount of time to complete a task, or a lack of consistent responses from a segment of users, among other factors. System 100 automatically creates product designs based on consumer feedback and obtains further feedback on these designs, allowing innovative design that aligns with consumer preferences and needs without designing and holding focus groups. Design improvements can occur at a faster pace and with the aid of more representative data. In addition, the additional feedback can be used as input to, for example, networks that train the behavioral model to improve the model's classification of what constitutes a positive example or a negative example.

Figure 5A:
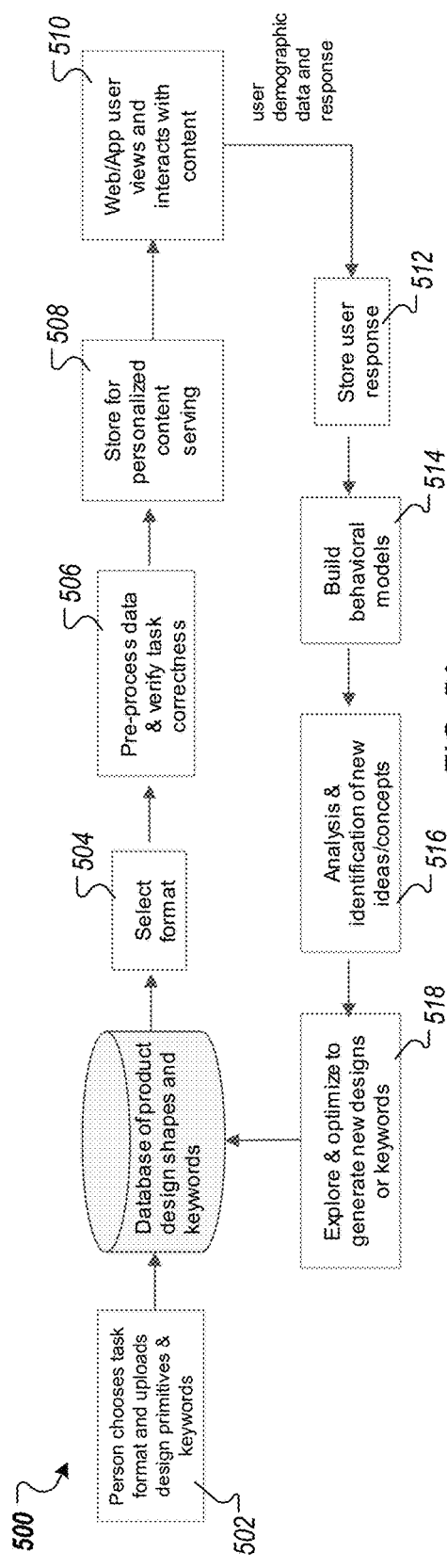
FIGS. 5A and 5B depict data flows of specific examples in which the system uses behavioral models to generate tasks for users.
Figure 5B:
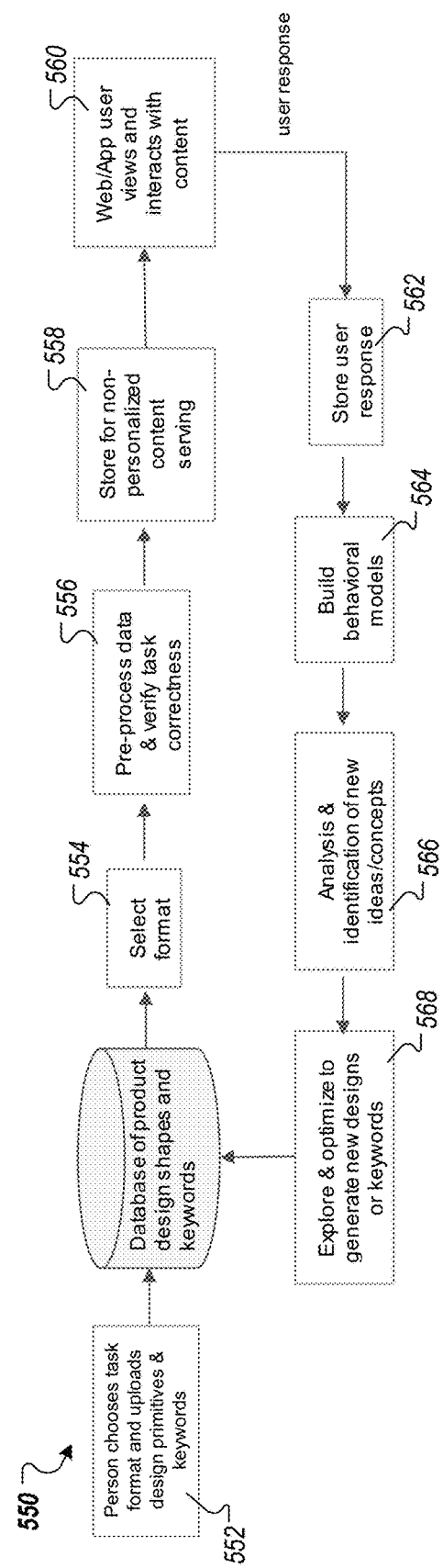

FIGS. 5A and 5B depict data flows in which the system uses behavioral models to generate tasks for users.

FIG. 5A depicts a data flow 500 in which the system has user consent to personalize the tasks that the user receives in the example environment of FIG. 1. Operations of data flow 500 are performed by various components of the system 100. For example, operations of data flow 400 can be performed by data quality processor 120 in communication with DCDS 110, user device 106, third party 140, and labelled database 130.

Flow 500 begins with a person uploading one or more design primitives and/or semantic descriptors such as keywords or ways to express user preferences such as a user click or text entry (502). The uploaded data may provide information that allows a human to express preferences, semantic descriptions, or ratings that may be mapped to a given design or more using visual or aural elements or features of the product or service being designed. For example, a market research person can provide system 100 with a product design for a backpack and a set of keywords associated with the backpack, such as "sporty," "functional," "practical," and "professional." The design primitives can be for products or services, and can include designs for physical products and digital products. In another example, the task can present designs, descriptions, or features to determine the value or price of a product or service. These designs and/or keywords can be stored, for example, in a database of product designs and keywords. The person may also upload an experimental plan that determines which design classes or instances should be shown with which semantic descriptions. The experimental plan may also include statistical measurements or other guidance criteria for how, when, or where a given design type and semantic description are shown. In some implementations, the designs and/or keywords can be stored in digital component database 112 and/or labelled database 130.

Flow 500 continues with the system selecting a format for content to be provided to a user (504). For example, DCDS 110 of system 100 can select a layout for content to be provided to a user. The layout can include, for example, the types of user interface elements available and the type of information provided. In one example, DCDS 110 can select a layout for content that includes a slider and radio buttons for a task to be provided to a user when distributed. In another example, the format layout may include a reward that is provided to the user once they have responded.

Flow 500 continues with the system pre-processing data and verifying the correctness of a task to be provided to a user (506). For example, task processor 122 and data processor 124 of data quality processor 120 can pre-process data and verify the correctness of a task to be provided to a user based on the determined layout from (504).

Flow 500 continues with storing the pre-processed data and verified task to be provided to a user (508). In flow 500, the system 100 has user consent to provide personalized content, and thus the pre-processed data and verified task can be modified and/or personalized based on user information.

Flow 500 continues with a user of a website or application interacting with served content (510). For example, DCDS 110 can select the pre-processed data and verified task to be provided to a particular user of a website or application, as described above with respect to FIG. 1, and receive user input from the user's interaction with the served content.

Flow 500 continues with storing the user's response (512). For example, DCDS 110 can receive the user's response, which includes user information, such as user demographic data after the response data has been analyzed and processed by data processor 124 of data quality processor 120. The analyzed response data can be labelled by data processor 124 and stored in labelled database 130.

Flow 500 continues with building one or more behavioral models based on the user response data (514). An example of a behavioral model includes the use of linear or nonlinear function approximation (e.g. deep learning enabled convolutional neural networks) to map designs, design features, design deformations or graph based design representation to a semantic description or rating. An invertible model may be used that allows the mapping from input to output and vice versa or multiple models can be used to map input to output and vice versa. A behavioral model may also include user demographic information stored with a given user's response. An example would be the use of task data to create a model that allows one to view apparel design feedback for women between the ages of 20 and 30 residing in London. For example, a behavioral model could have user demographics as an input or be probabilistic in nature allowing a computer to condition the model response for a given demographic set of parameters. For example, model generator 126 of data quality processor 120 can generate behavioral models based on user response data as described above with respect to FIGS. 1-4. The model or model based analysis may also include information or inputs from other sources such as on-line surveys, pricing and conversion data, sales attribution models, theme clinics and focus group feedback. The model or model based analysis may also use pricing information secured from task feedback.

Flow 500 continues with analysis and identification of new ideas and/or concepts based on the one or more behavioral models (516). For example, model generator 126 of data quality processor 120 can analyze and identify, based on the outputs of the behavioral models, new design ideas and/or new design concepts.

Flow 500 continues with exploring and/or optimizing designs to generate new designs and/or keywords or semantic descriptors or preferences (518). For example, model generator 126 of data quality processor 120 can explore and/or optimize a design using a design space to generate a new design or modify an existing design. Model generator 126 can also generate new keywords that are associated with the design. For example, model generator 126 can generate new keywords that are trending or popular in current marketing materials and have been shown to be popular with users based on the behavioral models generated. Models can be used to generate designs from semantic descriptions or ratings and can be used to generate semantic descriptions or ratings from a given design. The models can be used to explore or optimize the model space to identify new designs or semantic descriptions that get included in future tasks. An example can be viewed in FIG. 3 where the model space is shown with designs positioned relative to two axes associated with keywords (stylish and practical). In this example, optimizing a cost function that weighs practical at 60% and 40% for stylish might select design 312. An example includes the use of behavioral models, including pricing feedback, secured from tasks where the optimization can take into consideration design trade-offs, costs and pricing. These new designs and/or keywords are provided to the database of product designs and keywords referenced in (502). In some implementations, the designs and/or keywords can be stored in digital component database 112 and/or labelled database 130.

FIG. 5B depicts a data flow 550 in which the system does not have user consent to personalize the tasks that the user receives in the example environment of FIG. 1. Operations of data flow 550 are performed by various components of the system 100. For example, operations of data flow 550 can be performed by data quality processor 120 in communication with DCDS 110, user device 106, third party 140, and labelled database 130.

Flow 550 closely follows flow 500. Flow 550 begins with a customer uploading one or more design primitives and/or keywords (552). Details of this step can be found above in the description of FIG. 5A with respect to (502).

Flow 550 continues with the system selecting a format for content to be provided to a user (554). Details of this step can be found above in the description of FIG. 5A with respect to (504).

Flow 550 continues with the system pre-processing data and verifying the correctness of a task to be provided to a user (556). Details of this step can be found above in the description of FIG. 5A with respect to (506).

Flow 550 continues with storing the pre-processed data and verified task to be provided to a user (558). In flow 550, the system 100 does not have user consent to provide personalized content, and thus neither of the pre-processed data or the verified task is modified or personalized based on user information.

Flow 550 continues with a user of a website or application interacting with served content (560). Details of this step can be found above in the description of FIG. 5A with respect to (510).

Flow 550 continues with storing the user's response (562). For example, DCDS 110 can receive the user's response, which may include user information, such as user demographic data after the response data has been analyzed and processed by data processor 124 of data quality processor 120. DCDS 110 can remove the user information if it is included. In some implementations, the user information is not provided because system 100 does not have the user's consent to access the user's information. The analyzed response data can be labelled by data processor 124 and stored in, labelled database 130.

Flow 550 continues with building one or more behavioral models based on the user response data (564). Details of this step can be found above in the description of FIG. 5A with respect to (514).

Flow 550 continues with analysis and identification of new ideas and/or concepts based on the one or more behavioral models (566). Details of this step can be found above in the description of FIG. 5A with respect to (516).

Flow 550 continues with exploring and/or optimizing designs to generate new designs and/or semantic descriptors (568). Details of this step can be found above in the description of FIG. 5A with respect to (518).

Figure 6A:
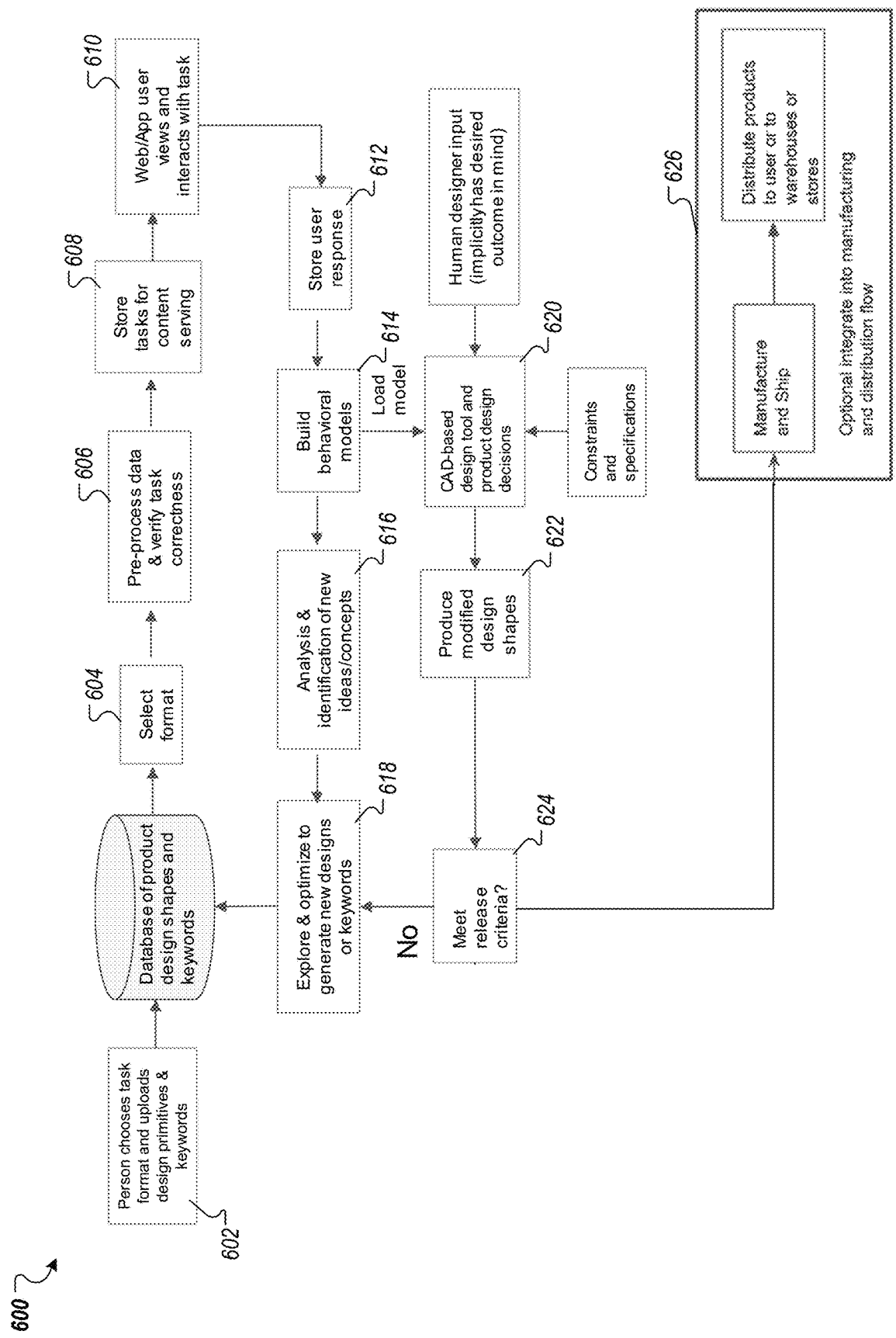
FIGS. 6A and 6B depict data flows of specific examples in which the system integrates user feedback into the design cycle.
Figure 6B:
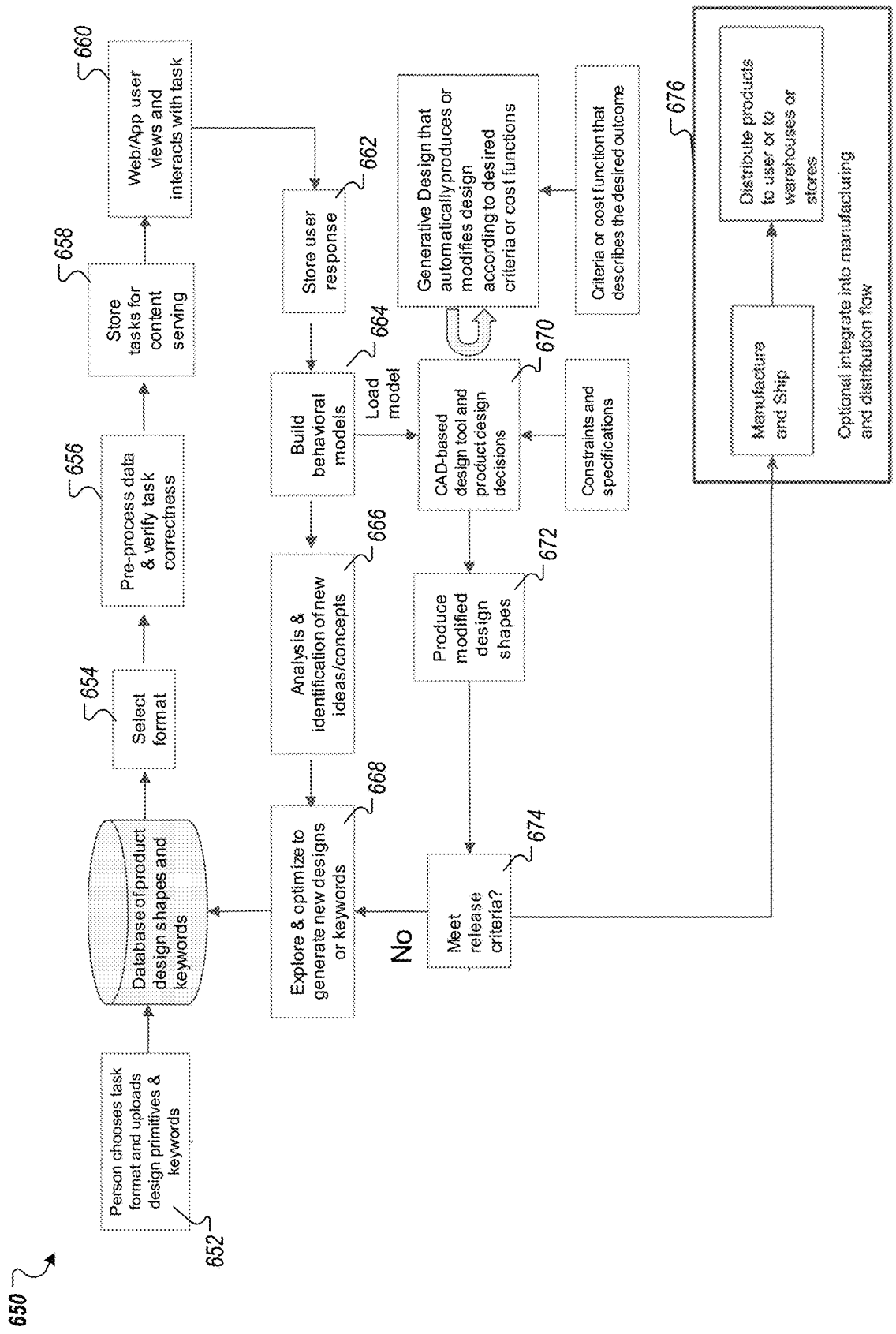

FIGS. 6A and 6B depict data flows in which the system integrates user feedback into the design cycle. FIGS. 6A and 6B build on the data flows depicted in FIGS. 5A and 5B. In some implementations, the system 100 has user consent to personalize content. In some implementations, system 100 does not have user consent to personalize content.

FIG. 6A depicts a data flow 600 in which the system integrates user feedback into the design cycle, subject to designer input in the example environment of FIG. 1. Operations of data flow 600 are performed by various components of the system 100. For example, operations of data flow 600 can be performed by data quality processor 120 in communication with DCDS 110, user device 106, third party 140, and labelled database 130.

Flow 600 closely follows flows 500 or 550. Flow 600 begins with a person choosing a task format and uploading design primitives and semantic descriptors (602). Details of this step can be found above in the description of FIG. 5A with respect to (502) or FIG. 5B with respect to (552). For example, a user can upload design primitives, or design shapes, and associated keywords to a database. This database stores the initial product design shapes and keywords as well as any updates based on the response of the users who view the tasks. For example, the database can store updates based on step 618.

Flow 600 continues with the system selecting a format for content to be provided to a user (604). Details of this step can be found above in the description of FIG. 5A with respect to (504) or FIG. 5B with respect to (554). The format of the primitives and the semantic descriptors in storage is selected by a person or can automatically be configured by the system.

Flow 600 continues with the system pre-processing data and verifying the correctness of a task to be provided to a user (606). Details of this step can be found above in the description of FIG. 5A with respect to (506) or FIG. 5B with respect to (556). Data may be pre-processed, for example, to identify a set of keywords that are viable for particular design shapes. Additionally, the data may be verified for appropriateness or correctness for a given format or the desired audience of users. In some implementations, tasks may be relevant to a particular country, geography or demographic characteristic. For example, interpretations of a French language description may not be relevant as a task for non-French speaking users for a large segment of the US and Europe. The tasks can be stored and served with content that is distributed over the Internet or through applications.

Flow 600 continues with storing the pre-processed data and verified task to be provided to a user (608). Details of this step can be found above in the description of FIG. 5A with respect to (508) or FIG. 5B with respect to (558).

Flow 600 continues with a user of a website or application interacting with served content (610). Details of this step can be found above in the description of FIG. 5A with respect to (510) or FIG. 5B with respect to (560). For example, the user interacts with the content and a request is made for a task. The user can then interact with the task, providing a response. For example, the user may choose the most appropriate keyword or label for a photo or image of a product design.

Flow 600 continues with storing the user's response (612). Details of this step can be found above in the description of FIG. 5A with respect to (512) or FIG. 5B with respect to (562). In some implementations, only the response is recorded. In some implementations, the response and the user demographic data may be stored.

Flow 600 continues with building one or more behavioral models based on the user response data (614). Details of this step can be found above in the description of FIG. 5A with respect to (514) or FIG. 5B with respect to (564). For example, a model can map keywords and semantic descriptors to particular design shapes or geometries. In another example, a model maps a product feature to a preferred ensemble of other features or maps a product to a preferred ensemble of other products. These models can also map design features or decisions to customer preference and value.

Flow 600 continues with analysis and identification of new ideas and/or concepts based on the one or more behavioral models (616). Details of this step can be found above in the description of FIG. 5A with respect to (516) or FIG. 5B with respect to (566). For example, the models are analyzed and identified to generate data and results that may be used to help determine a new task.

Flow 600 continues with exploring and/or optimizing designs to generate new designs and/or keywords (618). Details of this step can be found above in the description of FIG. 5A with respect to (518) or FIG. 5B with respect to (568). For example, the system can use the data to explore and optimize or modify the task content, format, or messaging, in response to the analysis. Any learnings, modifications, updates that are related to model, analysis and design decisions and optimizations are stored in the database.

Flow 600 includes loading the behavioral models into a CAD-based design tool and making product design decisions based on the behavioral models (620). In some implementations, a human designer can provide input to the CAD-based design tool and/or provide product design decisions. For example, a human designer can implicitly have a desired semantically described outcome in mind and can shape the output of the CAD-based design tool and automatically generated product design decisions made by model generator 126. The CAD-based design tool can also receive constraints and specifications provided by, for example, a human designer, a product manufacturer, or customers. In some implementations, the models that capture user feedback or behavior can be made available directly or indirectly for use in computer aided design decisions and manufacturing production. These models can be used for analysis or to modify the design.

Flow 600 continues with producing a modified design shape (622). For example, model generator 126 can produce a modified design shape using the behavioral models and a design space for the product. In some implementations, the model can map keyword descriptions to actual 3D product designs and a designer can use a keyword description and user feedback to produce a new or modified design. The design can be represented as explicit shapes, data structures that represent shapes or deformations to a given shape or as a shape graph. In one example, the designer uses the models to create or modify a design based on other products that it may be sold or bundled with. This loop can iterate until the product requirements or release criteria are met. If they are met, then the design is provided as a specification, manufacturing directions, recipe or a method that guides or directs the manufacturing process. The resulting product can be sent to the original users who provided feedback or provided to warehouses or stores for distribution to customers. In some implementations, this approach can be provided in a manual way where the information is provided to humans who make the decisions. In some implementations, this approach can be used to automatically modify the design according to constraints, specifications or a cost function that guides the design toward a better state. In some implementations, this approach can use a hybrid where some steps are made by humans and some are automated.

Flow 600 continues with determining whether the modified design shape meets release criteria (624). For example, model generator 126 can determine, based on release criteria from, for example, a product designer, manufacturer, shipper, etc. whether a design shape is appropriate for release or manufacturing.

Flow 600 can optionally include manufacturing and shipping a product having the modified design shape (626). For example, the design process can be integrated with the manufacturing and distribution work flow of a product. In some implementations, the product can be distributed to warehouses, stores, and directly to users who have preferences similar to the user who provided the initial response, such as other users within the same group, cluster, location, or user segment, among other shared groupings.

FIG. 6B depicts a data flow 650 in which the system integrates user feedback into the design cycle to automatically generate new designs in the example environment of FIG. 1. Operations of data flow 650 are performed by various components of the system 100. For example, operations of data flow 650 can be performed by data quality processor 120 in communication with DCDS 110, user device 106, third party 140, and labelled database 130.

A key feature of flow 650 is that generative design may be used to augment a human designer's vision, and in some implementations, can fully replace a human designer based on a desired outcome.

Flow 650 closely follows flows 500, 550, or 600. Flow 650 begins with a customer uploading one or more design primitives and/or keywords (652). Details of this step can be found above in the description of FIG. 5A with respect to (502), FIG. 5B with respect to (552), or FIG. 6A with respect to (602).

Flow 650 continues with the system selecting a format for content to be provided to a user (654). Details of this step can be found above in the description of FIG. 5A with respect to (504), FIG. 5B with respect to (554), or FIG. 6A with respect to (604).

Flow 650 continues with the system pre-processing data and verifying the correctness of a task to be provided to a user (656). Details of this step can be found above in the description of FIG. 5A with respect to (506), FIG. 5B with respect to (556), or FIG. 6A with respect to (606).

Flow 650 continues with storing the pre-processed data and verified task to be provided to a user (658). Details of this step can be found above in the description of FIG. 5A with respect to (508), FIG. 5B with respect to (558), or FIG. 6A with respect to (608).

Flow 650 continues with a user of a website or application interacting with served content (660). Details of this step can be found above in the description of FIG. 5A with respect to (510), FIG. 5B with respect to (560), or FIG. 6A with respect to (610).

Flow 650 continues with storing the user's response (662). Details of this step can be found above in the description of FIG. 5A with respect to (512), FIG. 5B with respect to (562), or FIG. 6A with respect to (612).

Flow 650 continues with building one or more behavioral models based on the user response data (664). Details of this step can be found above in the description of FIG. 5A with respect to (514), FIG. 5B with respect to (564), or FIG. 6A with respect to (614).

Flow 650 continues with analysis and identification of new ideas and/or concepts based on the one or more behavioral models (666). Details of this step can be found above in the description of FIG. 5A with respect to (516), FIG. 5B with respect to (566), or FIG. 6A with respect to (616).

Flow 650 continues with exploring and/or optimizing designs to generate new designs and/or semantic descriptors (668). Details of this step can be found above in the description of FIG. 5A with respect to (518), FIG. 5B with respect to (568), or FIG. 6A with respect to (618).

Flow 650 includes loading the behavioral models into a CAD-based design tool and making product design decisions based on the behavioral models (670). In some implementations, a generative design process can be used to automatically produce or modify designs according to desired criteria or cost functions. This generative design process can provide input to the CAD-based design tool and/or provide product design decisions. For example, a generative design system can determine or receive an appropriate cost function based on a desired outcome. The CAD-based design tool can also receive constraints and specifications provided by, for example, a human designer, a product manufacturer, or customers. For example, artificial intelligence methods can be used with iterative generative design to search the design space and produce a design that meets specifications as well as the result of behavioral models.

Flow 650 continues with producing a modified design shape (672). Details of this step can be found above in the description of FIG. 6A with respect to (622).

Flow 650 continues with determining whether the modified design shape meets release criteria (674). Details of this step can be found above in the description of FIG. 6A with respect to (624).

Flow 650 can optionally include manufacturing and shipping a product having the modified design shape (676). Details of this step can be found above in the description of FIG. 6A with respect to (626).

In one example, a task can include showing a user two different products, such as shoes, and asking the user which shoe pairs better with the apparel being shown. The apparel can be, for example, a suit. The apparel can include multiple different items of clothing and ask the user to select an ensemble.

In one example, a task can include ways for a user to configure or modify a design and solicit feedback on how to create new products or improve existing ones. The improved products can then be provided to users in new tasks who can iteratively improve product designs.

In one example, a task can include showing a user two different product designs, such as designs for a car, and providing a feedback mechanism, such as sliders or buttons, for the user to provide a rating of how well a user believes a given attribute, such as the subjective product design descriptor (or adjective) "compact" describes each design.

The computer aided design process can be automatically driven to generate and modify a design according to criteria and specifications. Cost functions may be used to trade off design criteria or factors within the constraints and specifications. The behavioral model may be used with the cost function to maximize user preferences within the constraints, specifications or manufacturing rules. For example, generative design methods can be used to iterate across the design space guided by behavioral models and a cost function or decision criteria. The use of generative design includes the use of AI and reinforcement learning to iterate across the many design decisions that are allowed or within the specifications or constraints but may represent different customer preferences such as the body style of a car or color combination of a running shoe. Generative algorithm approaches include one or more of evolutionary algorithms, variational autoencoders, and generative adversarial networks. These methods can utilize cloud computing to iterate through a massive number of design iterations to optimize to individual customers, segments of customers or multiple segments of customers. Examples of algorithms that may be used include evolutionary algorithms including genetic algorithms that evolve a given design or create hybrids of multiple designs. In some implementations, the system can use generative adversarial networks that input multiple existing designs to produce completely new designs. These methods can iterate to produce new designs that tasks present to users to provide feedback on. The whole process could be automated to iterate and optimize to produce new designs. In some implementations, this system can be integrated into automated manufacturing flows using robotics or 3D printing. In some implementations, this system can be used to personalize products to users or user segments based on their provided preferences.

Variational autoencoders and related generative adversarial networks can be used along with the task-produced behavioral models to evolve new designs that are then fed into the system for additional user feedback. The system iterates and is scored until it reaches stopping criteria defined by a cost function.

A variational autoencoder can be used with a library of designs represented as images, shapes, shape related data structures, shape related graphs or polygonal data. A variational autoencoder may be used to create a set of latent factors that effectively represent a reduced set of features that describe a given design. Once the variational autoencoder is trained, a design is encoded into its latent factor and then decoded into its reconstructed design. In one example, existing libraries of design representations can be used to build the initial mapping to speed convergence. The behavioral model developed using task-based feedback can be used to map a given reconstructed design representation to the user characterization or classification. In some implementations, the user classification can be a scoring of good (preferred) versus bad (non-preferred). The user/human-based characterization can be used together with a cost function to create a mathematical representation or score that can be used by an optimizer to create or improve the design. The output of the optimizer is a design type associated with a latent factor description. The optimization could even use genetic mutation or cross-over to create a new latent factor. The new latent factor can be passed through the decoder/generator to produce a new design representation that can be inserted into a new task. The design, latent factor, and keywords all form a space of designs and distance metrics that can be used to relate or cluster one design to another in the creation of new tasks shown to users. This system can automatically iterate around the design space until the cost based scoring converges where the latent factors produced either meet the stopping criteria or the modifications are very small. At that point, the design is considered finished and ready for production.

In another implementation, creating or optimizing the designs can include creating a mathematical representation of the design space where every car or apparel design is represented by a design feature defined by each dimension of the space. An N-dimensional feature space is represented in N-space. In many cases that space can be transformed to a lower dimensional space. In other cases, a distance metric can be used to cluster or segment the design instances into classes. A distance from every design instance or class to another can be calculated and stored. The behavioral model represents the mapping between the design instance and a set of keywords or semantic descriptions by the task evaluator/user. This mapping can be explored to find designs that are similar to the most promising designs rated thus far (optimization) or dissimilar to those designs (exploration) to discover and explore new parts of the design space. This system can be used with distance-based clustering methods, for example K-nearest neighbor or collaborative filtering, to define a design instance for future tasks shown to the user.

Figure 7A:
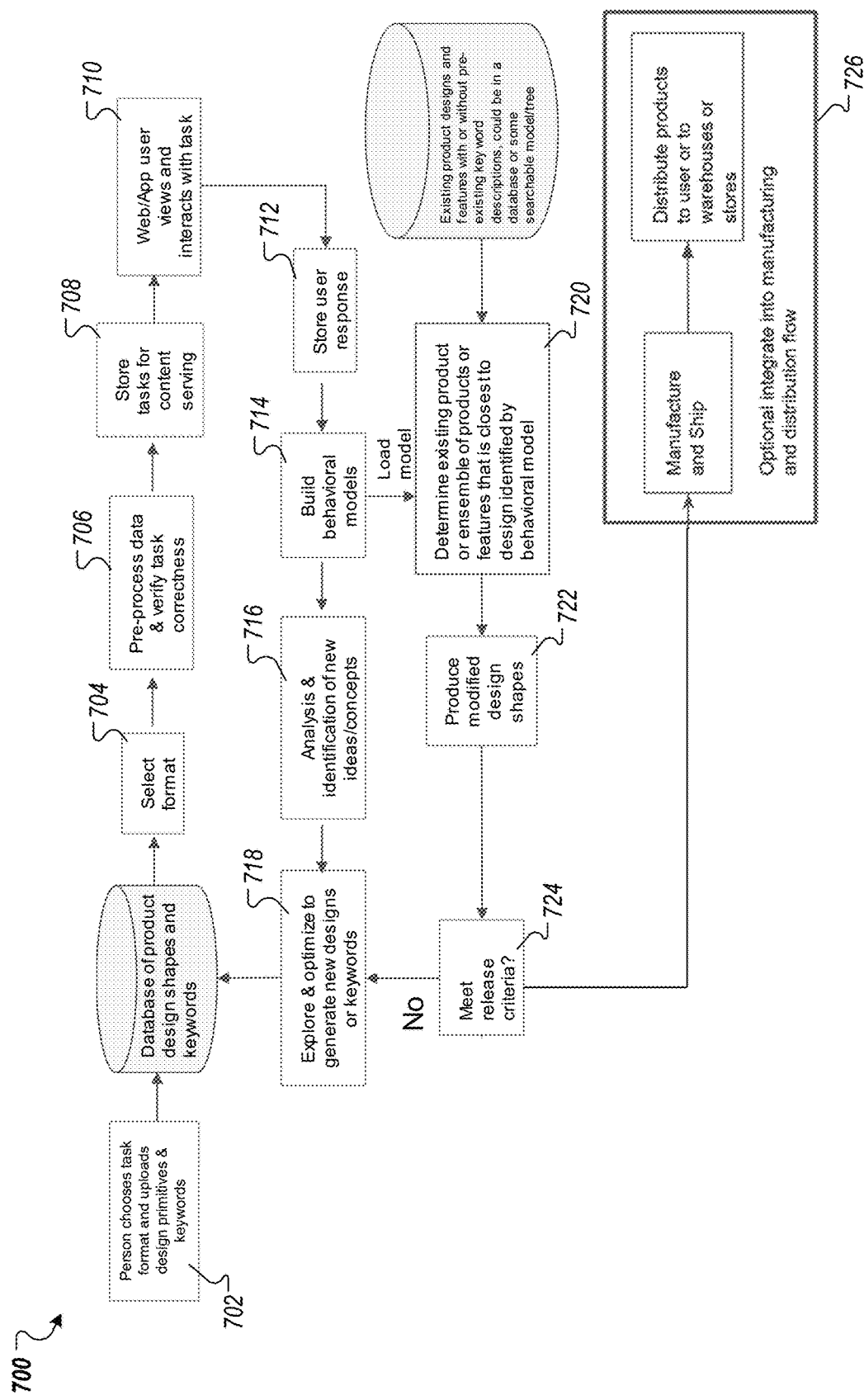
FIGS. 7A and 7B depict data flows of specific examples in which the system implements user feedback to customize existing designs and products.
Figure 7B:
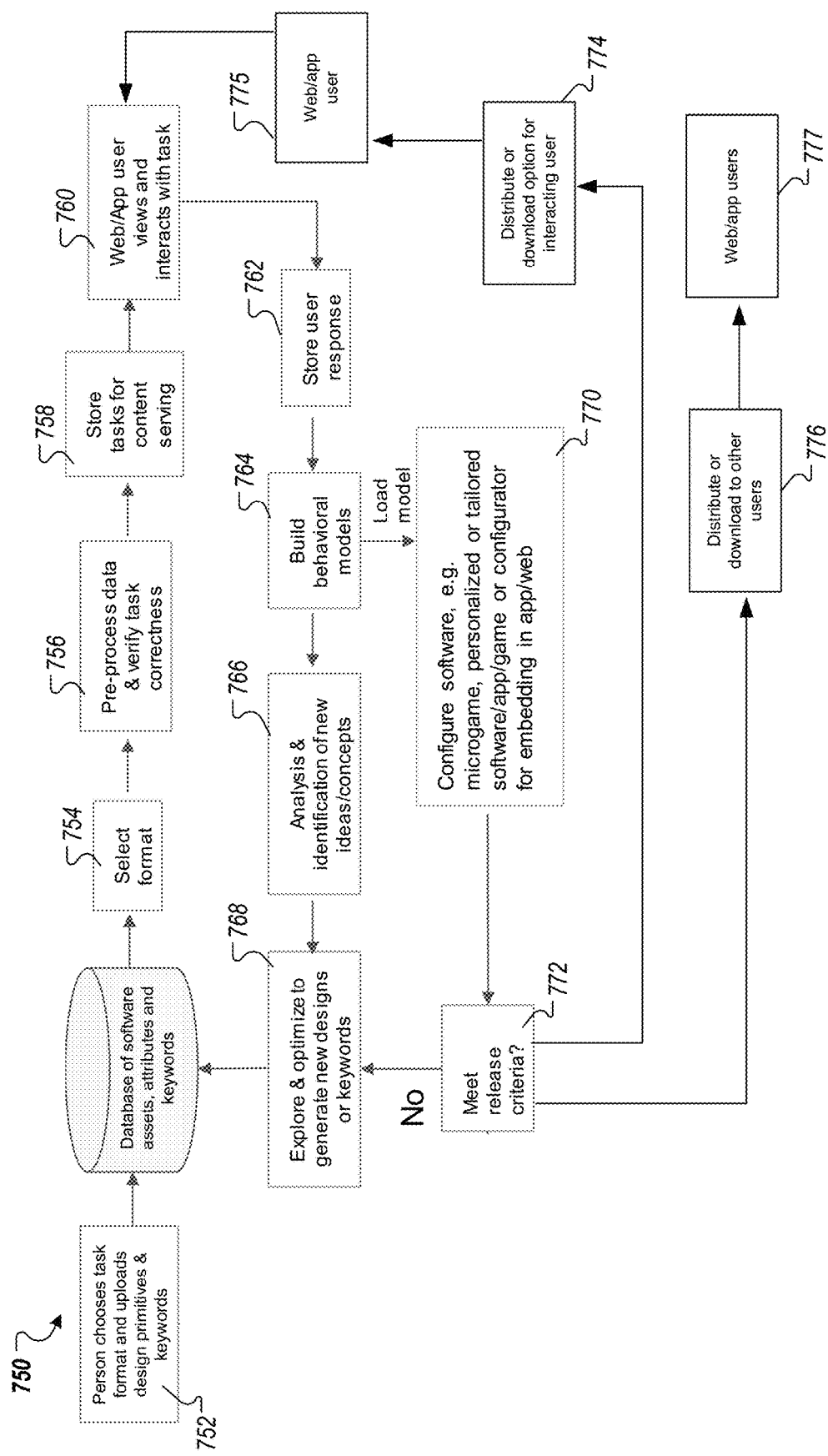

FIGS. 7A and 7B depict data flows in which the system implements user feedback to customize existing designs and products.

FIG. 7A depicts a data flow 700 in which the system implements user feedback to modify existing designs and products in the example environment of FIG. 1. Operations of data flow 700 are performed by various components of the system 100. For example, operations of data flow 700 can be performed by data quality processor 120 in communication with DCDS 110, user device 106, third party 140, and labelled database 130.

Data flow 700 can be integrated with various manufacturing processes, including 3D printing or automatic manufacturing.

Flow 700 closely follows flows 500, 550, 600, or 650. Flow 700 begins with a customer uploading one or more design primitives and/or keywords (702). Details of this step can be found above in the description of FIG. 5A with respect to (502), FIG. 5B with respect to (552), FIG. 6A with respect to (602), or FIG. 6B with respect to (652).

Flow 700 continues with the system selecting a format for content to be provided to a user (704). Details of this step can be found above in the description of FIG. 5A with respect to (504), FIG. 5B with respect to (554), FIG. 6A with respect to (604), or FIG. 6B with respect to (654).

Flow 700 continues with the system pre-processing data and verifying the correctness of a task to be provided to a user (706). Details of this step can be found above in the description of FIG. 5A with respect to (506), FIG. 5B with respect to (556), FIG. 6A with respect to (606), or FIG. 6B with respect to (656).

Flow 700 continues with storing the pre-processed data and verified task to be provided to a user (708). Details of this step can be found above in the description of FIG. 5A with respect to (508), FIG. 5B with respect to (558), FIG. 6A with respect to (608), or FIG. 6B with respect to (658).

Flow 700 continues with a user of a website or application interacting with served content (710). Details of this step can be found above in the description of FIG. 5A with respect to (510), FIG. 5B with respect to (560), FIG. 6A with respect to (610), or FIG. 6B with respect to (660).

Flow 700 continues with storing the user's response (712). Details of this step can be found above in the description of FIG. 5A with respect to (512), FIG. 5B with respect to (562), FIG. 6A with respect to (612), or FIG. 6B with respect to (662).

Flow 700 continues with building one or more behavioral models based on the user response data (714). Details of this step can be found above in the description of FIG. 5A with respect to (514), FIG. 5B with respect to (564), FIG. 6A with respect to (614), or FIG. 6B with respect to (664).

Flow 700 continues with analysis and identification of new ideas and/or concepts based on the one or more behavioral models (716). Details of this step can be found above in the description of FIG. 5A with respect to (516), FIG. 5B with respect to (566), FIG. 6A with respect to (616), or FIG. 6B with respect to (666).

Flow 700 continues with exploring and/or optimizing designs to generate new designs and/or semantic descriptors (718). Details of this step can be found above in the description of FIG. 5A with respect to (518), FIG. 5B with respect to (568), FIG. 6A with respect to (618), or FIG. 6B with respect to (668).

Flow 700 includes using the behavioral models to identify an existing product or ensemble of products having features that most closely follow the design identified by the behavioral models (720). In some implementations, model generator 126 can access a database or other searchable structure that stores existing product designs and features with or without pre-existing keyword descriptions.

Flow 700 continues with producing a modified design shape (722). Details of this step can be found above in the description of FIG. 6A with respect to (622) or FIG. 6B with respect to (672).

Flow 700 continues with determining whether the modified design shape meets release criteria (724). Details of this step can be found above in the description of FIG. 6A with respect to (624) or FIG. 6B with respect to (674).

Flow 700 can optionally include manufacturing and shipping a product having the modified design shape (726). Details of this step can be found above in the description of FIG. 6A with respect to (626) or FIG. 6B with respect to (676).

In one example, a task includes displaying an ensemble of product designs. For example, the ensemble of product designs can include different product designs for different item types such as room furnishings (e.g., designs for chairs, tables, beds, accessories, art, etc.) and asks the user to select which of the different product designs and different item types the user believes look visually appealing together. In some implementations, the user feedback can be used in subsequent tasks to test existing and form new marketing strategies such as cross-selling and up-selling strategies.

In another example, a task includes a way for a user to design or configure a product, such as shoes or a car, and a way for the user to receive the product or for the manufacturer to make and ship the product to the user. For example, the user can provide input through the feedback mechanism to indicate a new design or a design configured using a set of predetermined characteristic values.

In another example, a task includes a way for the user to modify an existing product design and have the manufacturer provide (e.g., using a 3D printer) a custom tailored product to the user. For example, the user can provide input through the feedback mechanism to indicate modifications to an existing design.

FIG. 7B depicts a data flow 750 in which the system implements user feedback to customize software designs and products in the example environment of FIG. 1. Operations of data flow 750 are performed by various components of the system 100. For example, operations of data flow 750 can be performed by data quality processor 120 in communication with DCDS 110, user device 106, third party 140, and labelled database 130.

Data flow 750 uses the semantic behavioral models to configure software products to be tailored to, for example, a particular user, user segment, or group, etc. In one example, data flow 750 is used to create a microgame with characters, weapons, environments, and/or situations, among other features, selected or customized based on a user's information.

Flow 750 closely follows flows 500, 550, 600, 650, or 700. Flow 750 begins with a customer uploading one or more design primitives and/or semantic descriptors (752). Details of this step can be found above in the description of FIG. 5A with respect to (502), FIG. 5B with respect to (552), FIG. 6A with respect to (602), FIG. 6B with respect to (652), or FIG. 7A with respect to (702).

Flow 750 continues with the system selecting a format for content to be provided to a user (754). Details of this step can be found above in the description of FIG. 5A with respect to (504), FIG. 5B with respect to (554), FIG. 6A with respect to (604), FIG. 6B with respect to (654), or FIG. 7A with respect to (704).

Flow 750 continues with the system pre-processing data and verifying the correctness of a task to be provided to a user (756). Details of this step can be found above in the description of FIG. 5A with respect to (506), FIG. 5B with respect to (556), FIG. 6A with respect to (606), FIG. 6B with respect to (656), or FIG. 7A with respect to (706).

Flow 750 continues with storing the pre-processed data and verified task to be provided to a user (758). Details of this step can be found above in the description of FIG. 5A with respect to (508), FIG. 5B with respect to (558), FIG. 6A with respect to (608), FIG. 6B with respect to (658), or FIG. 7A with respect to (708).

Flow 750 continues with a user of a website or application interacting with served content (760). Details of this step can be found above in the description of FIG. 5A with respect to (510), FIG. 5B with respect to (560), FIG. 6A with respect to (610), or FIG. 6B with respect to (660), or FIG. 7A with respect to (710).

Flow 750 continues with storing the user's response (762). Details of this step can be found above in the description of FIG. 5A with respect to (512), FIG. 5B with respect to (562), FIG. 6A with respect to (612), FIG. 6B with respect to (662), or FIG. 7A with respect to (712).

Flow 750 continues with building one or more behavioral models based on the user response data (764). Details of this step can be found above in the description of FIG. 5A with respect to (514), FIG. 5B with respect to (564), FIG. 6A with respect to (614), FIG. 6B with respect to (664), or FIG. 7A with respect to (714).

Flow 750 continues with analysis and identification of new ideas and/or concepts based on the one or more behavioral models (766). Details of this step can be found above in the description of FIG. 5A with respect to (516), FIG. 5B with respect to (566), FIG. 6A with respect to (616), FIG. 6B with respect to (666), or FIG. 7A with respect to (716).

Flow 750 continues with exploring and/or optimizing designs to generate new designs and/or semantic descriptors (768). Details of this step can be found above in the description of FIG. 5A with respect to (518), FIG. 5B with respect to (568), FIG. 6A with respect to (618), FIG. 6B with respect to (668), or FIG. 7A with respect to (718).

Flow 750 includes using the behavioral models to configure a software or digital product to be personalized or tailored to a user's preferences (770). In some implementations, the software product is personalized using a configurator. In some implementations, the software product can be a microgame. In some implementations, the software product can be embedded within a webpage or application.

For example, if user information indicates that a particular user enjoys the Star Wars franchise and the software product is a microgame, data quality processor 120, and specifically model generator 126 can, with permission from the user and Lucasfilm, modify the microgame to include characters, audio, items, etc. from the Star Wars franchise.

In another example, a game developer takes an existing or new game that may have many levels, characters, weapons and allows users through tasks to select a section that can be configured with user feedback to allow for a small portion to be playable through on-line or a downloadable form.

Flow 750 continues with determining whether the modified game design meets release criteria (772). Details of this step can be found above in the description of FIG. 6A with respect to (624), FIG. 6B with respect to (674), or FIG. 7A with respect to (724).

Flow 750 can optionally include distributing or providing a download option with the modified game design to the user who was interacting with the system and providing feedback (774) and the actual delivery of the modified game design to the other users (775). Details of this step can be found above in the description of FIG. 6A with respect to (626), FIG. 6B with respect to (676), or FIG. 7A with respect to (726).

In one example, a task includes showing a user two different software game characters or attributes related to a gaming application, such as a window size, and asking which is more interesting to the user. In some examples, the method can also include offering, for the user to download, software that is pre-configured with the chosen characters or attributes. In another example, the method can include an offering, for the user to play the game on-line with software pre-configured with the chosen characters or attributes. In another example, the behavioral models created through task feedback from one or more users to design new software such as apps or games that may have multiple forms with characters, settings, backgrounds tailored to one or more user demographics. In another example, multiple users can use tasks to collaboratively design game features that are inserted into a multiplayer game environment that the users may have access to.

Flow 750 can optionally include distributing or providing a download option with the modified game design to users other than the user who was interacting with the system and providing feedback (776) and the actual delivery of the modified game design to the other users (777). Implementation details are the same as for (774).

Figure 7C:
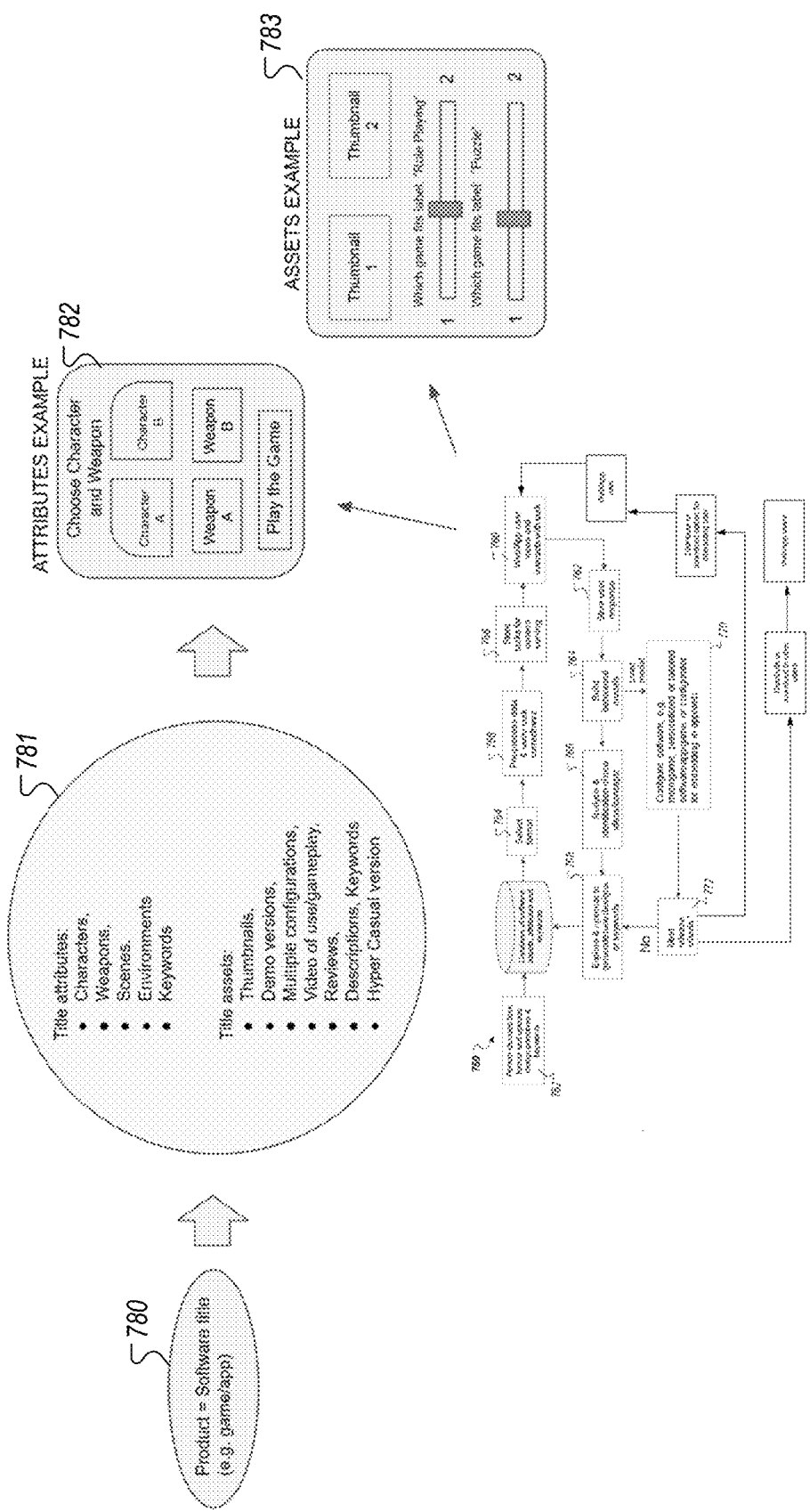
FIGS. 7C-7F depict specific examples in which the system implements user feedback into the design cycle.

FIG. 7C is a specific example in which the system implements user feedback into the design cycle as described with respect to FIG. 7B. The system can receive a product such as a software title (780). For example, the system can receive a game or application. The system can identify attributes and assets of the product. For example, the system can determine attributes of the game including characters, weapons, scenes, environments, keywords, etc. The system can identify assets of the game including thumbnails, demo versions, multiple configurations, video of use/gameplay, reviews, descriptions, keywords, hyper casual version, etc. A user can be presented with attributes of the game (782). For example, the user can be presented with Character A, Character B, Weapon A, and Weapon B. The user can make their selection and choose to play the game. A user can be presented with assets of the game (783). For example, the user can be presented with Thumbnail 1 and Thumbnail 2 and two sliders asking for user input. The first slider asks "Which game is this label: 'Role Playing'" and the user can drag the slider to the side representing their answer. The second slider asks "Which game is this label: 'Puzzle.'"

Figure 7D:
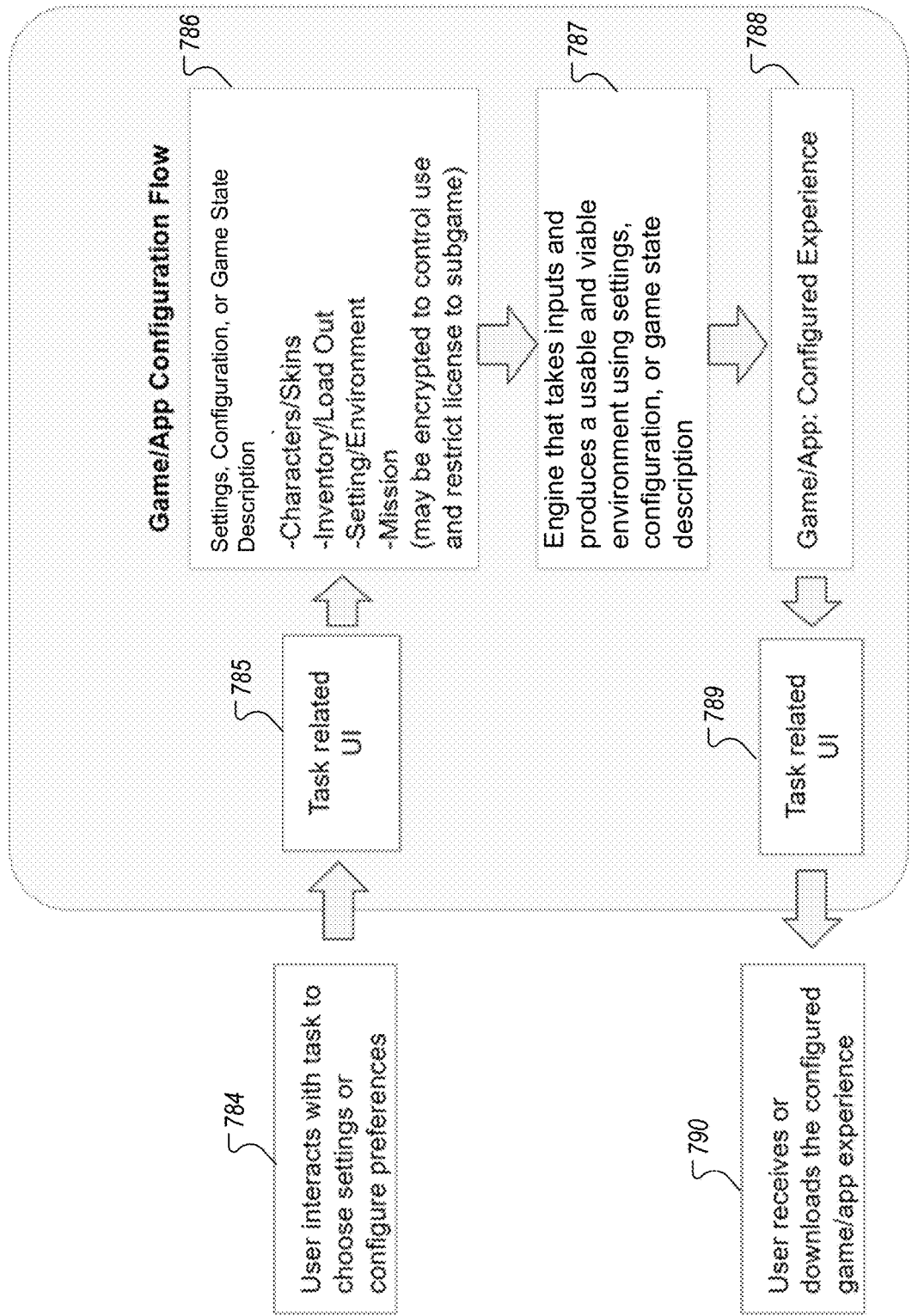

FIG. 7D is a specific example in which the system implements user feedback into the design cycle as described with respect to FIG. 7B. The user can interact with a task to choose settings or configure preferences (784). The user can be presented with a task-related UI element (785). The game or application can be configured using a flow as outlined by (786)-(786). For example, the flow can include settings, configuration, or game state description such as characters/skins, inventory/load out, setting/environment, mission (786). These settings and configurations may be encrypted to control use and restrict licenses to the subgame. The engine can then take inputs and produce a usable and viable environment using settings, configuration, or game state description (787). The game or application can then be a configured/personalized experience (788). The configured game or application can be provided through a task-related UI element (789) to a user. A user can then receive or download the configured game or application (790). The user can be the same user who interacted with the task in (784) or a different user.

Figure 7E:
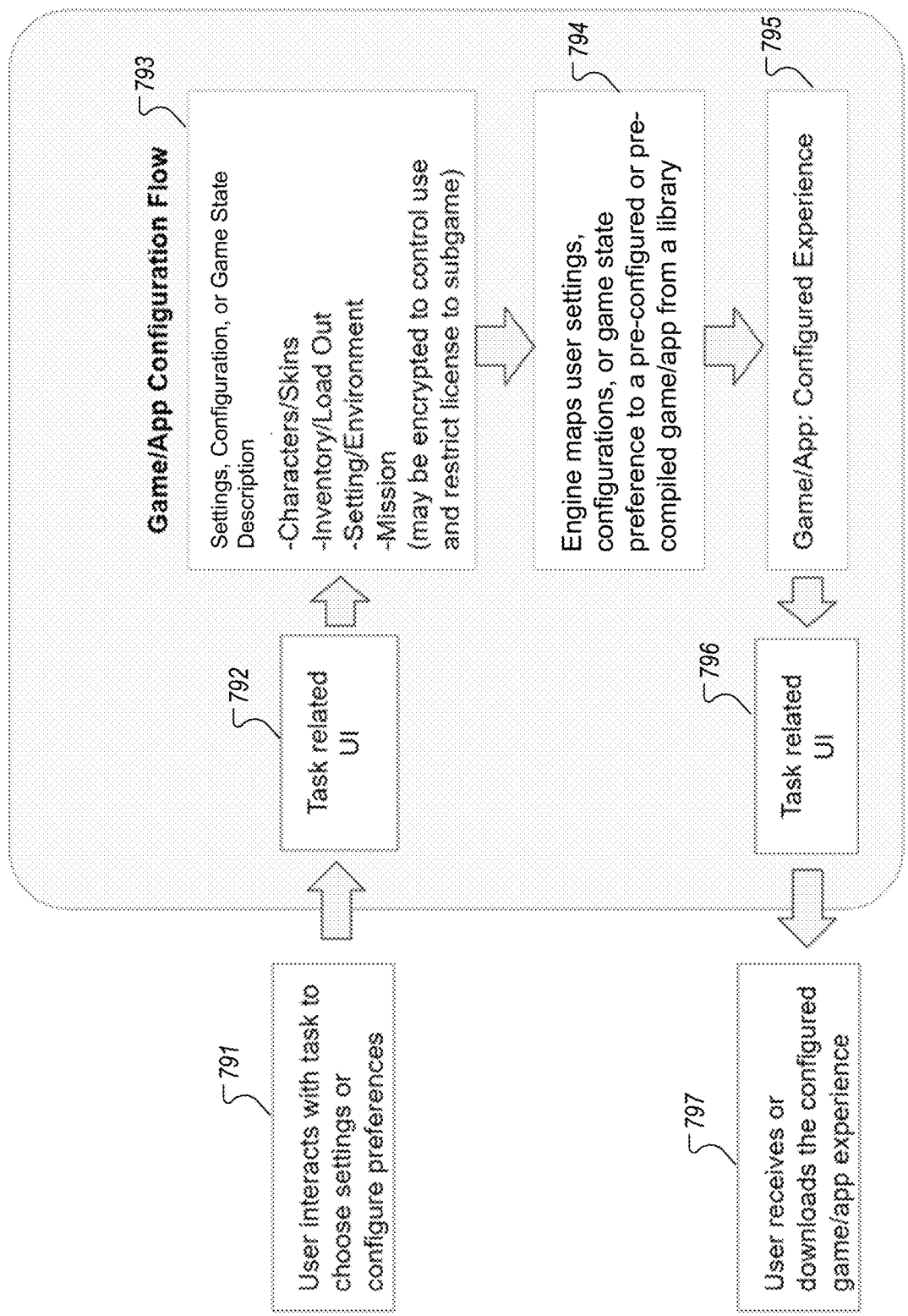

FIG. 7E is a specific example in which the system implements user feedback into the design cycle as described with respect to FIG. 7B. The user can interact with a task to choose settings or configure preferences (791). The user can be presented with a task-related UI element (792). The game or application can be configured using a flow as outlined by (793)-(795). For example, the flow can include a settings, configuration, or game state description such as characters/skins, inventory/load out, setting/environment, mission (793). These settings and configurations may be encrypted to control use and restrict licenses to the subgame. The engine can then map user settings, configurations, or game state preferences to a pre-configured or pre-compiled game/app from a library (794). The game or application can then be a configured/personalized experience (795). The configured game or application can be provided through a task-related UI element (796) to a user. A user can then receive or download the configured game or application (797). The user can be the same user who interacted with the task in (791) or a different user.

Figure 7F:
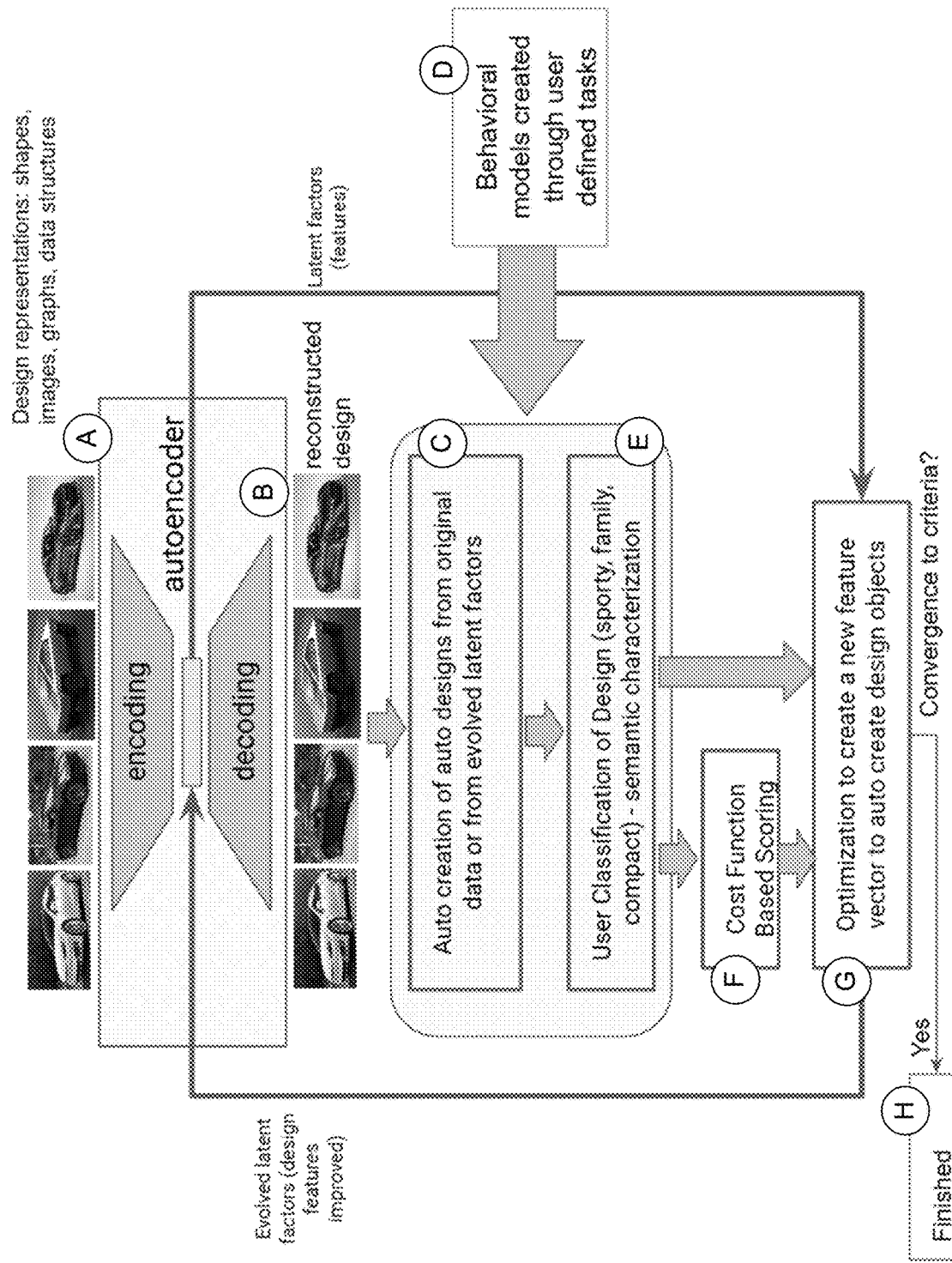

FIG. 7F is a specific example in which the system implements user feedback into the design feedback using an autoencoder. As described above, an autoencoder can be used with a library of designs and used to create a set of latent factors that effectively represent a reduced set of features that describe a given design. The system can access a library of design representations including shapes, images, graphs, data structures, etc. (A). The system can then generate a reconstructed design (B) using a set of latent factors that effectively represent a set of features that describe the design. The system can automatically create an automobile design from original data or from evolved latent factors, or improved design features (C). The system can receive results from behavioral models created through user defined tasks (D). The system can use the behavioral models along with user classifications of automobile designs (e.g., sport, family-focused, compact) in the form of semantic characterization (E). The system uses a cost function-based scoring method (F) and performs optimization to create a new feature vector to automatically create design objects (G). If the optimization converges to a set of specific criteria, the method is finished (H).

Figure 8:
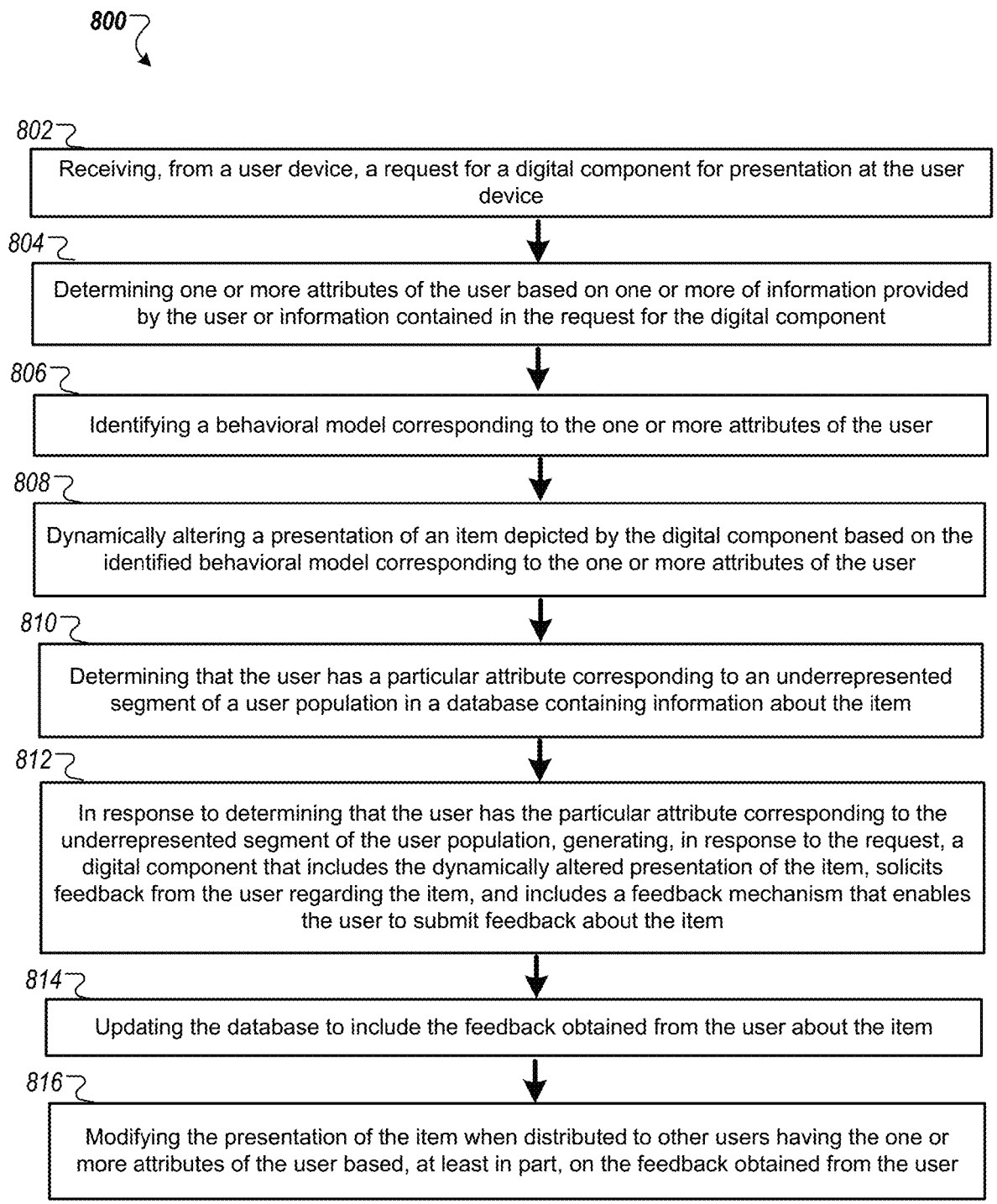
FIG. 8 is a flow chart of an example process for data quality improvement.

FIG. 8 is a flow chart of an example process 800 for data quality improvement. In some implementations, process 800 can be performed by one or more systems. For example, process 800 can be implemented by data quality processor 120, DCDS 110, user device 106, and third party 140 of FIGS. 1-2 and 4. In some implementations, the process 800 can be implemented as instructions stored on a non-transitory computer readable medium, and when the instructions are executed by one or more servers, the instructions can cause the one or more servers to perform operations of the process 800.

Process 800 begins by receiving, from a user device, a request for a digital component for presentation at the user device (802). For example, system 100 can received a request 108 from a user device 106.

Process 800 continues by determining one or more attributes of the user based on one or more of information provided by the user or information contained in the request for the digital component (804). As discussed above with respect to FIG. 2A, data processor 124 can determine one or more attributes of a user based on information provided by the user, such as a user profile, or information contained in the request. For example, information provided in a user profile can include the user's age, gender, interests, and location, among other characteristics. Information contained in the request 108 can include anonymized information or information that cannot be used to identify the user, and can include, for example, the website from which the request 108 was generated and a destination website to which the user was navigating. In one example, data processor 124 can determine that the user is a man who is older than 65.

Process 800 continues by identifying a behavioral model corresponding to the one or more attributes of the user (806). For example, model generator 126 can identify a behavioral model that predicts a user's behavior based on the one or more attributes of the user. In one example, model generator 126 can identify a behavioral model for men older than 65.

Process 800 continues by dynamically altering a presentation of an item depicted by the digital component based on the identified behavioral model corresponding to the one or more attributes of the user (808). For example, the task processor 122 and/or the data processor 124 can dynamically modify presentation, such as a task question, of an item depicted by the digital component based on the identified behavioral model corresponding to the one or more attributes of the user. In one example, the task processor 122 can modify the task question regarding a mug design depicted in the task based on the behavioral model for a man who is older than 65.

In some implementations, task processor 122 selects, for the digital component that solicits feedback from the user regarding the item, a format in which the feedback is solicited. For example, task processor 122 selects a format for user reactions to a particular mug design.

In some implementations, data quality processor 120 dynamically alters a presentation of an item depicted by the digital component based on the identified behavioral model corresponding to the one or more attributes of the user comprises using machine learning or artificial intelligence techniques to identify feedback to be solicited from the user regarding the item. For example, data quality processor 120 can use the output of model generator 126 to identify feedback to be solicited from the user regarding the mug design.

In some implementations, task processor 122 verifies, based on the particular attribute corresponding to the underrepresented segment of the user population, the information that is solicited by the digital component. For example, task processor 122 verifies that the information being solicited by the task to be distributed based on the user age attribute.

Process 800 continues by determining that the user has a particular attribute corresponding to an underrepresented segment of a user population in a database containing information about the item (810). For example data processor 124 can determine, based on a threshold number of responses, that the user segment of men older than 65 is an underrepresented segment. In some implementations, data processor 124 uses statistical analysis to identify the underrepresented segment of the user population. Data processor 124 can then determine that the user of the user device 106 has the age attribute corresponding to the underrepresented segment of the user population in a database containing information about mug designs.

Process 800 continues by, in response to determining that the user has the particular attribute corresponding to the underrepresented segment of the user population, generating, in response to the request, a digital component that includes the dynamically altered presentation of the item, solicits feedback from the user regarding the item, and includes a feedback mechanism that enables the user to submit feedback about the item (812). For example, task processor 122 can generate an altered presentation of the item, or an altered task, that solicits feedback form the user of user device 106 regarding the mug design and includes a feedback mechanism, such as a poll feature, that enables the user to submit feedback about the item. In some implementations, the DCDS 110 generates the digital component or selects the digital component to be distributed to user device 106 as described above with respect to FIGS. 1-7.

Process 800 continues by updating the database to include the feedback obtained from the user about the item (814). For example, data processor 124 can update a database containing information about the item with the feedback from the user of the user device 106.

In some implementations, in response to receiving the feedback from the user having the particular attribute corresponding to the underrepresented segment of the user population, data quality processor 120 labels the feedback information with the one or more attributes of the user and stores, in a labelled, searchable database, such as labelled database 130, the labelled feedback information.

Process 800 continues by modifying presentation of the item when distributed to other users having the one or more attributes of the user based, at least in part, on the feedback obtained from the user (816). For example, data quality processor 120 can modify the presentation of the item when distributed to other users who share the one or more attributes of the user based on the feedback obtained from the user. This allows data quality processor 120 to adapt its tasks and product designs based on the attributes of users who interact with the system.

In some implementations, data quality processor 120 can modify the presentation of the item when distributed to other users having the one or more attributes of the user by selecting a particular feedback mechanism included by the digital component.

Figure 9:
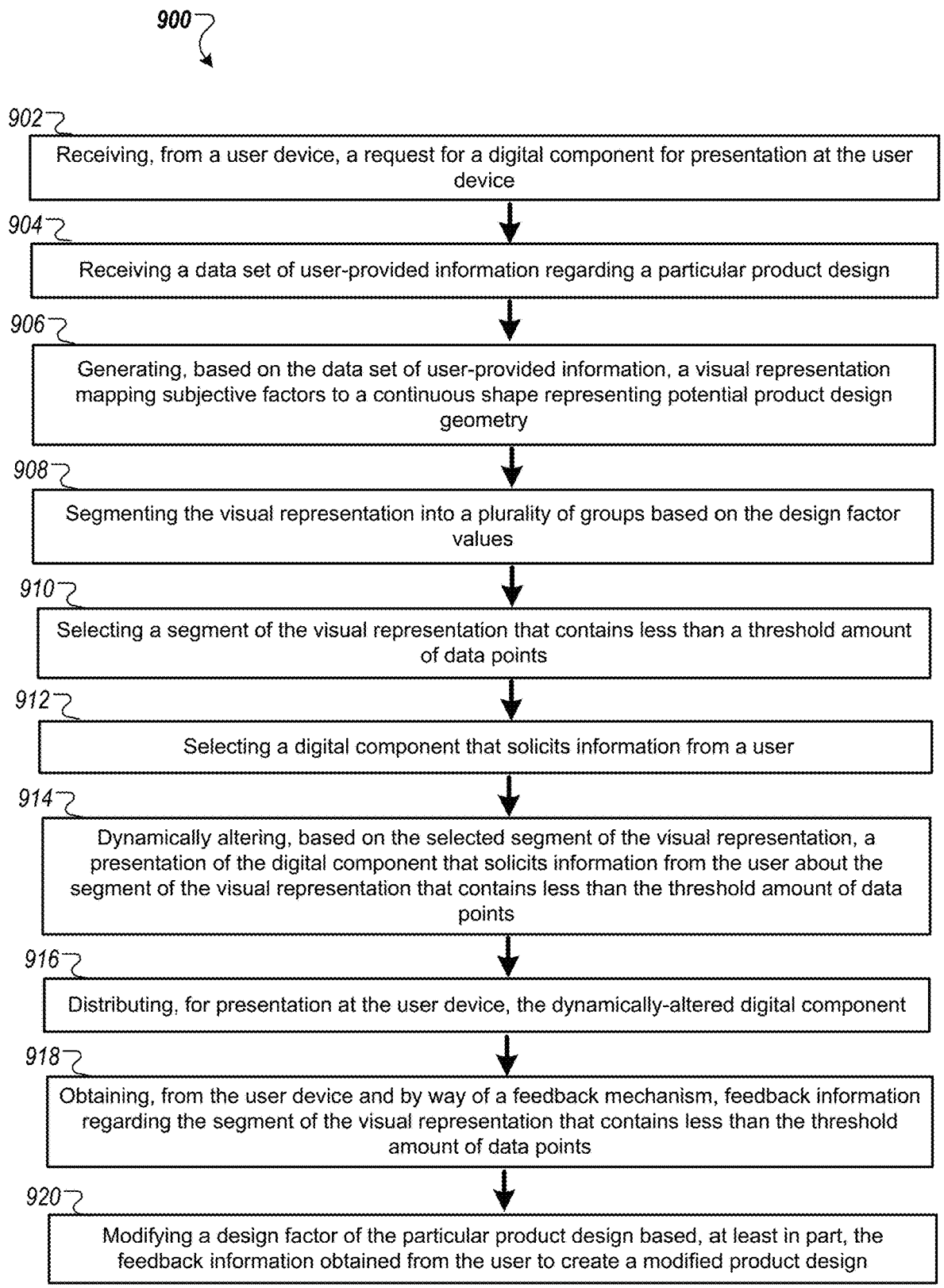
FIG. 9 is a flow chart of an example process for automatic design space exploration.

FIG. 9 is a flow chart of an example process 900 for automatic design space exploration. In some implementations, process 900 can be performed by one or more systems. For example, process 900 can be implemented by data quality processor 120, DCDS 110, user device 106, and third party 140 of FIGS. 1-2 and 4. In some implementations, the process 600 can be implemented as instructions stored on a non-transitory computer readable medium, and when the instructions are executed by one or more servers, the instructions can cause the one or more servers to perform operations of the process 900.

Process 900 begins by receiving, from a user device, a request for a digital component for presentation at the user device (902). For example, as described above, system 100, and specifically DCDS 110 can receive a request 108 for a digital component for presentation at a user device 106.

Process 900 continues by receiving a data set of user-provided information regarding a particular product design (904). For example, data quality processor 120 can receive user-provided responses regarding a particular product design, such as a handbag design. In some implementations, the product design is for a particular product. The product design can be for a service or a software product. For example, the particular product design can be a user interface design for a software application.

Process 900 continues by generating, based on the data set of user-provided information, a visual representation mapping design factors to a continuous shape representing potential product design geometry (906). As described above with respect to FIGS. 3-4, model generator 126 can generate a design space mapping subjective factors to a continuous shape representing potential product designs. For example, model generator 126 can generate a design space mapping semantic factors such as descriptors to a continuous shape representing the universe of possible designs.

The design space can be invertible such that generating, based on the data set of user-provided information, the visual representation mapping design factors to a continuous shape representing potential product design geometry comprises generating the visual representation by mapping potential product design geometry to design factors.

Process 900 continues by segmenting the visual representation into a plurality of segments based on the design factor values (908). As described above with respect to FIGS. 3-4, model generator 126 can segment the design space into groups based on the values of the subjective factors.

In some implementations, segmenting the visual representation into a plurality of segments based on the design factor values includes dividing, based on the design factor values, the visual representation into a plurality of segments such that each segment of the visual representation shares design factor values within a defined range of values. For example, data processor 124 can segment a design space into multiple segments based on a range of design factor values, such as a subjective rating of how comfortable a handbag design is perceived to be.

Process 900 continues by selecting a segment of the visual representation that contains less than a threshold amount of data points (910). As described above with respect to FIGS. 3-4, data processor 124 can identify a segment of data according to a metric such as a threshold number of data points. For example, data processor 124 can identify the segment of bags that are very "stylish" and very "practical" as a segment having less than a threshold amount of data points, or falling short of other metrics.

Process 900 continues by selecting a digital component that solicits information from a user (912). For example, task processor 122 or DCDS 110 can select a digital component that solicits information from a user. Task processor 122 can select or generate a task for the user that solicits information from the user.

In some implementations, task processor 122 selects, for the digital component that solicits information from the user, a format in which the feedback is solicited. For example, task processor 122 selects a format for user reactions to a handbag design.

In some implementations, selecting a format in which the information is solicited comprises selecting a particular feedback mechanism to be provided with the dynamically-altered digital component.

In some implementations, task processor 122 verifies, based on the particular attribute corresponding to the under-represented segment of the user population, the information that is solicited by the digital component. For example, task processor 122 verifies that the information being solicited by the task to be distributed based on the user age attribute.

Process 900 continues by dynamically altering, based on the selected segment of the visual representation, a presentation of the digital component that solicits information from the user about the segment of the visual representation that contains less than the threshold amount of data points (914). For example, as described above with respect to FIGS. 3-4, task processor 122 can dynamically alter an existing task or generate a new task. In one example, task processor 122 can alter an existing task to present a user with a new product design that has not been previously generated or presented to a user.

In some implementations, dynamically altering the presentation of the content item includes using machine learning or artificial intelligence techniques to specify information to be requested by the digital component. For example data quality processor 120 can use machine learning models generated by model generator 126 to determine and specify information to be requested by the task In some implementations, dynamically altering the presentation of the digital component includes determining, based on the request for the digital component for presentation at the user device, that the user of the user device is in a first cluster of users interested in the particular product design and identifying, based on determining that the user of the user device is in the first cluster of users interested in the particular product design, a user interface element of the digital component, and altering the user interface element of the presentation of the digital component. For example, data processor 124 can determine that a user of the user device 106 is in a cluster of interested users, identify a user interface element of the task, and alter the user interface element to customize the task to a user who is already interested in the handbag design.

In some implementations, dynamically altering the presentation of the digital component includes determining, based on the request for the digital component for presentation at the user device, that the user of the user device is in a first cluster of users interested in the particular product design, wherein the request for the digital component for presentation at the user device indicates one or more attributes of the user based on information provided by the user, identifying, based on determining that the user of the user device is in the first cluster of users interested in the particular product design, a user interface element of the digital component, and altering the user interface element of the presentation of the digital component.

In some implementations, process 900 includes building, based on the feedback information, a behavioral model that predicts user reception of potential product design geometry.

For example, model generator 126 can generate a behavioral model that predicts user reception of handbag product designs. The modification of design factors of the particular product design is based, at least in part, on the behavioral model.

Process 900 continues by distributing, for presentation at the user device, the dynamically-altered digital component (916). For example, DCDS 110 can distribute the task and any requested content as a reply 114 to user device 106.

Process 900 continues by obtaining, from the user device and by way of a feedback mechanism, feedback information regarding the segment of the visual representation that contains less than the threshold amount of data points (918). For example, DCDS 110 can receive, and provide to data processor 124, response data 116 from user device 106. As described above with respect to FIGS. 3-4, data quality processor 120 can receive feedback information from a user regarding a particular segment of the visual representation. For example, data processor 124 and DCDS 110 can receive feedback information from user device 106 regarding the segment of the design space that has less than a threshold amount of data points.

In some implementations, the request for the digital component for presentation at the user device indicates user demographic information of the user of the user device. The process 900 can further include determining, based on the request for the digital component for presentation at the user device, that the user of the user device is in a first group of users, such as a group of users who are women in California.

In some implementations, the process 900 can further include receiving, from a second user device, a request for a digital component for presentation at the second user device that indicates user demographic information of a user of the second user device. The system 100 (e.g., data processor 124) can then determine, based on the request for the digital component for presentation at the second user device, that the user of the second user device is in the same first group of users as the user of the user device. For example, the system 100 (e.g., data processor 124) can determine that the user of the second device is a woman in California. In response to determining that the user of the second user device is in the same first group of users as the user of the user device, system 100 can provide the modified product design rather than the particular product design. For example, task processor 122 can provide the modified handbag design to the user of the second user device instead of the original handbag design because of the similarities between the user of the first user device and the user of the second user device.

Process 900 continues by modifying a design factor of the particular product design based, at least in part, on the feedback information obtained from the user to create a modified product design (920). For example, model generator 126 can modify a design factor of a handbag design based, at least in part, on the feedback information from the user to create a modified handbag design.

As described above with respect to FIGS. 3-4, model generator 126 can update the design space and/or the behavioral model. For example, model generator 126 can update the data set by providing the feedback information as input to the training system for the behavioral model or a design generator.

In some implementations, process 900 includes identifying, based on the modified product design and from a plurality of existing product designs, a closest existing product design that has a number or largest number of design factor values in common with the modified product design.

For example, data quality processor 120 can identify an existing product that most closely follows the modified design. System 100 can, for example, modify the existing product and its manufacturing methods instead of generating an entirely new product. In some implementations, system 100 can provide the modified product design to an integrated manufacturing system. For example, data quality processor 120 can provide the modified product design to a 3D printing system or an automated manufacturing system for immediate production.

Figure 10:
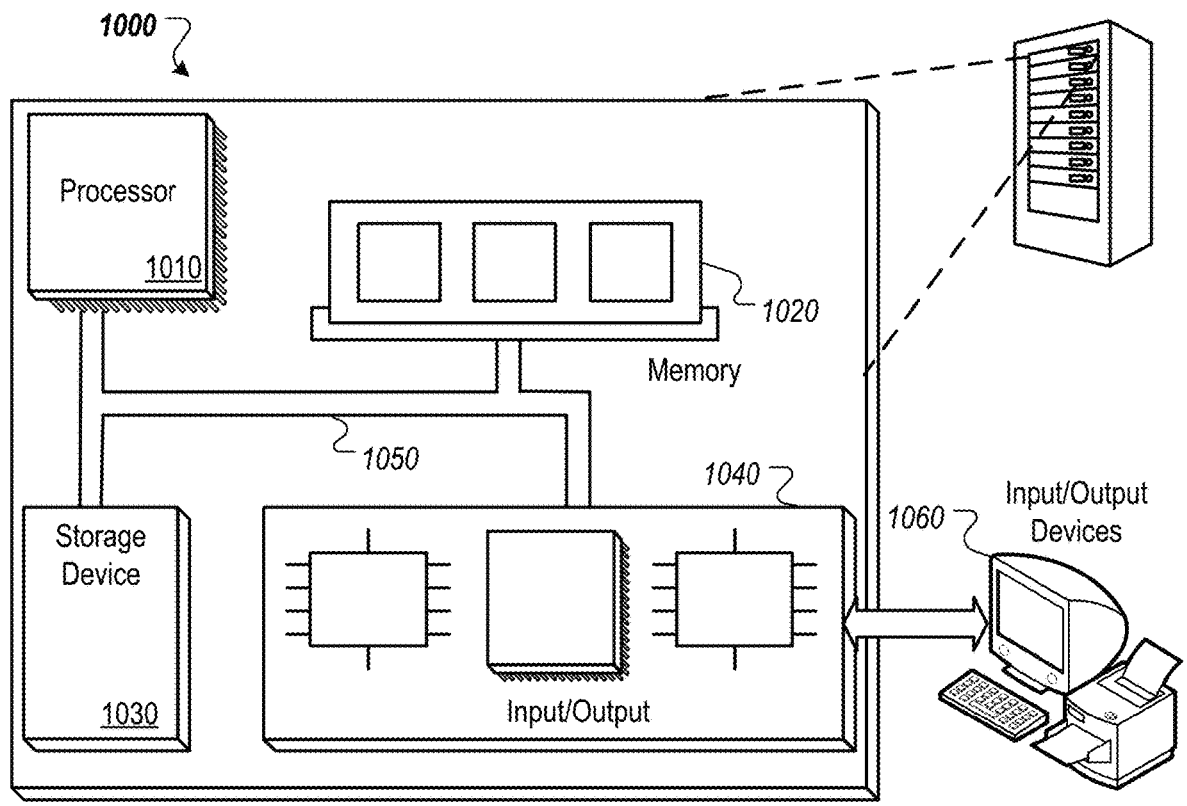
FIG. 10 is a block diagram of an example computing system.

FIG. 10 is block diagram of an example computer system 1000 that can be used to perform operations described above. The system 1000 includes a processor 1010, a memory 1020, a storage device 1030, and an input/output device 1040. Each of the components 1010, 1020, 1030, and 1040 can be interconnected, for example, using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 can include, for example, a hard disk device, an optical disk device, a storage device that is shared over a network by multiple computing devices (e.g., a cloud storage device), or some other large capacity storage device.

The input/output device 1040 provides input/output operations for the system 1000. In one implementation, the input/output device 1040 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1060. Other implementations, however, can also be used, such as mobile computing devices, mobile communication devices, set-top box television client devices, etc.

Although an example processing system has been described in FIG. 10, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for generating new product designs comprising:
   receiving, from a user device of a user, a request for a digital component for presentation at the user device;
   receiving a data set of user-provided information regarding a particular product design;
   generating, based on the data set of user-provided information, a visual representation mapping design factors that represent subjective characteristics of the particular product design to a continuous shape representing potential product design geometries;
   segmenting the visual representation into a plurality of segments based on values of the design factors;
   selecting a segment of the visual representation that contains less than a threshold amount of data points from the data set;
   selecting a digital component that solicits information from the user;
   dynamically altering, based on the selected segment of the visual representation, a presentation of the digital component such that the dynamically-altered digital component solicits information from the user about the segment of the visual representation that contains less than the threshold amount of data points;

distributing, for presentation at the user device, the dynamically-altered digital component;

obtaining, from the user device and by way of a feedback mechanism, feedback information regarding the segment of the visual representation that contains less than the threshold amount of data points; and modifying a value of a given design factor of the particular product design based, at least in part, on the feedback information obtained from the user to create a modified product design.

2. The method of claim 1, further comprising:

selecting, for the digital component that solicits information from the user, a format in which the information is solicited; and verifying, based on the selected segment of the visual representation, the information that is solicited by the digital component that solicits information from the user.

3. The method of claim 2, wherein selecting a format in which the information is solicited comprises selecting a particular feedback mechanism to be provided with the dynamically-altered digital component.

4. The method of claim 1, further comprising:

determining, based on the request for the digital component for presentation at the user device, that the user of the user device is in a first group of users, wherein the request for the digital component for presentation at the user device indicates user demographic information of the user of the user device.

5. The method of claim 4, further comprising:

receiving, from a second user device, a request for a digital component for presentation at the second user device that indicates user demographic information of a user of the second user device;

determining, based on the request for the digital component for presentation at the second user device, that the user of the second user device is in the same first group of users as the user of the user device; and in response to determining that the user of the second user device is in the same first group of users as the user of the user device, providing the modified product design rather than the particular product design.

6. The method of claim 1, wherein segmenting the visual representation into a plurality of segments based on the values of the design factors comprises:

dividing, based on the design factor values, the visual representation into a plurality of segments such that each segment of the visual representation shares design factor values within a defined range of values.

7. The method of claim 1, wherein dynamically altering the presentation of the digital component comprises:

determining, based on the request for the digital component for presentation at the user device, that the user of the user device is in a first cluster of users interested in the particular product design, wherein the request for the digital component for presentation at the user device indicates one or more attributes of the user based on information provided by the user;

identifying, based on determining that the user of the user device is in the first cluster of users interested in the particular product design, a user interface element of the digital component; and altering the user interface element of the presentation of the digital component.

8. The method of claim 7, wherein the user interface element of the digital component is a visual theme of the digital component, and wherein altering the user interface element comprises modifying the visual theme of the digital component by modifying a color scheme and a brand mark presented in the digital component.

9. The method of claim 1, wherein dynamically altering the presentation of the digital component comprises:

determining, based on the request for the digital component for presentation at the user device, that the user of the user device is in a first group of users, wherein the request for the digital component for presentation at the user device contains information indicating one or more attributes of the user;

identifying, based on determining that the user of the user device is in the first group of users, a user interface element of the digital component; and altering the user interface element of the presentation of the digital component.

10. The method of claim 1, wherein the visual representation mapping design factors to a continuous shape representing potential product design geometries is invertible such that the generating, based on the data set of user-provided information, the visual representation mapping design factors to a continuous shape representing potential product design geometries comprises generating the visual representation by mapping potential product design geometries to design factors.

11. The method of claim 1, further comprising:

identifying, based on the modified product design and from a plurality of existing product designs, a closest existing product design that has a number of design factor values in common with the modified product design.

12. The method of claim 1, further comprising providing the modified product design to an integrated manufacturing system.

13. The method of claim 1, further comprising:

building, based on the feedback information, a behavioral model that predicts user reception of potential product design geometry; and wherein modifying a design factor of the particular product design is based, at least in part, on the behavioral model.

14. The method of claim 1, wherein the particular product design is a user interface design for a software application.

15. The method of claim 1, wherein dynamically altering the presentation of the digital component comprises using machine learning or artificial intelligence techniques to specify information to be requested by the digital component.

16. A system comprising:

one or more processors; and one or more memory elements including instructions that, when executed, cause the one or more processors to perform operations including:

receiving, from a user device of a user, a request for a digital component for presentation at the user device;

receiving a data set of user-provided information regarding a particular product design;

generating, based on the data set of user-provided information, a visual representation mapping design factors that represent subjective characteristics of the particular product design to a continuous shape representing potential product design geometries;
segmenting the visual representation into a plurality of segments based on values of the design factors;
selecting a segment of the visual representation that contains less than a threshold amount of data points from the data set;
selecting a digital component that solicits information from the user;
dynamically altering, based on the selected segment of the visual representation, a presentation of the digital component such that the dynamically-altered digital component solicits information from the user about the segment of the visual representation that contains less than the threshold amount of data points;
distributing, for presentation on the user device, the dynamically-altered digital component;
obtaining, from the user device and by way of a feedback mechanism, feedback information regarding the segment of the visual representation that contains less than the threshold amount of data points; and
modifying a value of a given design factor of the particular product design based, at least in part, on the feedback information obtained from the user to create a modified product design.

17. The system of claim 16, the operations further comprising:
determining, based on the request for the digital component for presentation at the user device, that the user of the user device is in a first group of users; and
wherein the request for the digital component for presentation at the user device indicates user demographic information of the user of the user device.

18. The system of claim 17, the operations further comprising:
receiving, from a second user device, a request for a digital component for presentation at the second user device that indicates user demographic information of a user of the second user device;
determining, based on the request for the digital component for presentation at the second user device, that the user of the second user device is in the same first group of users as the user of the user device; and
in response to determining that the user of the second user device is in the same first group of users as the user of the user device, providing the modified product design rather than the particular product design.

19. A non-transitory computer storage medium encoded with instructions that when executed by a distributed computing system cause the distributed computing system to perform operations comprising:
receiving, from a user device of a user, a request for a digital component for presentation at the user device;
receiving a data set of user-provided information regarding a particular product design;
generating, based on the data set of user-provided information, a visual representation mapping design factors that represent subjective characteristics of the particular product design to a continuous shape representing potential product design geometries;
segmenting the visual representation into a plurality of segments based on values of the design factors;
selecting a segment of the visual representation that contains less than a threshold amount of data points from the data set;
selecting a digital component that solicits information from the user;
dynamically altering, based on the selected segment of the visual representation, a presentation of the digital component such that the dynamically-altered digital component solicits information from the user about the segment of the visual representation that contains less than the threshold amount of data points;
distributing, for presentation on the user device, the dynamically-altered digital component;
obtaining, from the user device and by way of a feedback mechanism, feedback information regarding the segment of the visual representation that contains less than the threshold amount of data points; and
modifying a value of a given design factor of the particular product design based, at least in part, on the feedback information obtained from the user to create a modified product design.

20. The non-transitory computer storage medium of claim 19, the operations further comprising:
receiving, from a second user device, a request for a digital component for presentation at the second user device that indicates user demographic information of a user of the second user device;
determining, based on the request for the digital component for presentation at the second user device, that the user of the second user device is in the same first group of users as the user of the user device; and
in response to determining that the user of the second user device is in the same first group of users as the user of the user device, providing the modified product design rather than the particular product design.

* * * * *